United States Patent
Venugopal et al.

(10) Patent No.: US 11,202,308 B2
(45) Date of Patent: Dec. 14, 2021

(54) RESOURCE ALLOCATION PATTERN SIGNALING FOR MINI-SLOTS

(71) Applicant: QUALCOMM incorporated, San Diego, CA (US)

(72) Inventors: Kiran Venugopal, Raritan, NJ (US); Makesh Pravin John Wilson, San Diego, CA (US); Tianyang Bai, Bridgewater, NJ (US); Tao Luo, San Diego, CA (US); Xiaoxia Zhang, San Diego, CA (US); Zhifei Fan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/392,339

(22) Filed: Apr. 23, 2019

(65) Prior Publication Data

US 2019/0335491 A1     Oct. 31, 2019

Related U.S. Application Data

(60) Provisional application No. 62/663,952, filed on Apr. 27, 2018.

(51) Int. Cl.
*H04W 72/12* (2009.01)
*H04W 72/04* (2009.01)
*H04W 76/27* (2018.01)
*H04L 5/00* (2006.01)
*H04B 7/06* (2006.01)

(52) U.S. Cl.
CPC ....... *H04W 72/1289* (2013.01); *H04L 5/0053* (2013.01); *H04W 72/042* (2013.01);
(Continued)

(58) Field of Classification Search
None
See application file for complete search history.

(56) References Cited

U.S. PATENT DOCUMENTS

| | | | |
|---|---|---|---|
| 2019/0082456 A1* | 3/2019 | Kim | H04L 1/1854 |
| 2019/0149365 A1* | 5/2019 | Chatterjee | H04L 5/0092 370/329 |
| 2019/0261195 A1* | 8/2019 | Cheng | H04W 24/10 |

OTHER PUBLICATIONS

AT&T: "Remaining Issues in DL/UL Resource Allocation", 3GPP TSG RAN WG1 Meeting #92, 3GPP Draft; R1-1802599 ATT RA, 3rd Generation Partnership Project (3GPP), Mobile Competence Centre, 650, Route Des Lucioles; F-06921 Sophia-Antipolis Cedex, France, vol. RAN WG1,No. Athens, Greece; Feb. 26, 2018-Mar. 2, 2018, Feb. 17, 2018 (Feb. 17, 2018), 16 pages, XP051398039, Retrieved from the Internet: URL: http://www.3gpp.org/ftp/tsg_ran/WG1_RL1/TSGR1_92/Docs/ [retrieved on Feb. 17, 2018].
(Continued)

*Primary Examiner* — Alex Skripnikov

(57) ABSTRACT

Methods, systems, and devices for wireless communications are described. A user equipment (UE) may receive control information indicating a resource allocation pattern for a downlink transmission that is configured for transmission using a plurality of beams and a plurality of mini-slots, where a duration of a mini-slot is less than a duration of a slot. The UE may identify a start time of a first mini-slot of the plurality of mini-slots and a length of the first mini-slot based on the resource allocation pattern, and receive the downlink transmission based on the start time of the first mini-slot and the length of the first mini-slot.

26 Claims, 18 Drawing Sheets

(52) U.S. Cl.
CPC ... *H04W 72/0446* (2013.01); *H04W 72/1273* (2013.01); *H04W 76/27* (2018.02); *H04B 7/0686* (2013.01); *H04L 5/0007* (2013.01)

(56) References Cited

OTHER PUBLICATIONS

Guangdong Oppo Mobile Telecom: "Search Space Design Consideration for NR PDCCH with BF", 3GPP TSG RAN WG1 Meeting #90, 3GPP Draft; R1-1713270, 3rd Generation Partnership Project (3GPP), Mobile Competence Centre, 650, Route Des Lucioles ; F-06921 Sophia-Antipolis Cedex, France, vol. RAN WG1, No. Prague, Czech Republic; Aug. 21, 2017-Aug. 25, 2017, Aug. 20, 2017 (Aug. 20, 2017), 7 pages, XP051316077, Retrieved from the Internet: URL: http://www.3gpp.org/ftp/Meetings_3GPP_SYNC/RAN1/Docs/ [retrieved on Aug. 20, 2017].
International Search Report and Written Opinion—PCT/US2019/028962—ISA/EPO—dated Aug. 12, 2019.
Mediatek Inc: "DL and UL Beam Management", 3GPP TSG RAN WG1 Meeting #90bis, 3GPP Draft; R1-1718333_Beamindication_ULBM_Final, 3rd Generation Partnership Project (3GPP), Mobile Competence Centre, 650, Route Des Lucioles; F-06921 Sophia-Antipolis Cedex, France, vol. RAN WG1, No. Prague, Czech Republic; Oct. 9, 2017-Oct. 13, 2017, Oct. 8, 2017 (Oct. 8, 2017), 7 pages, XP051341516, Retrieved from the Internet: URL: http://www.3gpp.org/ftp/Meetings_3GPP_SYNC/RAN1/Docs/ [retrieved on Oct. 8, 2017].

* cited by examiner

RESOURCE ALLOCATION PATTERN SIGNALING FOR MINI-SLOTS

CROSS REFERENCES

The present Application for patent claims priority to U.S. Patent Application No. 62/663,952 by Venugopal et al., entitled "Resource Allocation Pattern Signaling For Mini-Slots," filed Apr. 27, 2018, assigned to the assignee hereof and incorporated by reference herein.

BACKGROUND

The following relates generally to wireless communications and to resource allocation pattern signaling for mini-slots.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

SUMMARY

The described techniques relate to improved methods, systems, devices, and apparatuses that support resource allocation pattern signaling for mini-slots. In some cases, a base station and user equipment (UE) may support beamformed communications and may transmit and receive messages over a number of beams. The base station and UE may coordinate to determine over which beams messages are being transmitted.

As described in more detail below, a mini-slot may be a time resource that is less in duration than a slot. A resource allocation pattern may be configured and signaled as a start and length indicator (SLIV) pattern. Configuring and signaling resource allocation patterns for mini-slot level aggregation may provide greater flexibility and optimize downlink data reception when the base station or UE is configured for multiple transmission configuration indication (TCI) states. For example, a base station may adjust a rate of data transmission by configuring and signaling mini-slot-level resource allocation patterns of different durations on different beams.

In some cases, the base station may determine a mode of operation based on a channel quality indicator (CQI) report, or some other UE feedback report. For instance, a UE may transmit a report indicating a channel quality for a plurality of beams, and may receive an indication of a plurality of TCI states corresponding to the plurality of beams. In some aspects, each analog beam may be considered as a separate TCI state.

Following reception of the TCI states from the base station, the UE may also receive control information (e.g., downlink control information (DCI)) carried over a downlink control channel. In some cases, the DCI may include a time-domain physical downlink shared channel (PDSCH) resources field, which may indicate a row index of a higher layer (e.g., radio resource control (RRC)) configured table. The row index may assist the UE in determining the time or frequency resources over which the downlink data may be received. In some cases, a SLIV pattern defined in the row index may provide an indication of a start time of a first mini-slot and a length of the first mini-slot, based on which the UE may be able to determine the start times and lengths of one or more other mini-slots. In this way, the UE may imply the resource allocation patterns of multiple mini-slots from the resource allocation pattern of one mini-slot, which may reduce the signaling overhead associated with transmitting resource allocation patterns for multiple mini-slots.

A method of wireless communication at a UE is described. The method may include receiving control information indicating a resource allocation pattern for a downlink transmission that is configured for transmission using a set of beams and a set of mini-slots, where a duration of a mini-slot is less than a duration of a slot, identifying a start time of a first mini-slot of the set of mini-slots and a length of the first mini-slot based on the resource allocation pattern, and receiving the downlink transmission based on the start time of the first mini-slot and the length of the first mini-slot.

An apparatus for wireless communication at a UE is described. The apparatus may include a processor, memory coupled to the processor, and instructions stored in the memory. The instructions may be executable by the processor to cause the apparatus to receive control information indicating a resource allocation pattern for a downlink transmission that is configured for transmission using a set of beams and a set of mini-slots, where a duration of a mini-slot is less than a duration of a slot, identify a start time of a first mini-slot of the set of mini-slots and a length of the first mini-slot based on the resource allocation pattern, and receive the downlink transmission based on the start time of the first mini-slot and the length of the first mini-slot.

Another apparatus for wireless communication at a UE is described. The apparatus may include means for receiving control information indicating a resource allocation pattern for a downlink transmission that is configured for transmission using a set of beams and a set of mini-slots, where a duration of a mini-slot is less than a duration of a slot, identifying a start time of a first mini-slot of the set of mini-slots and a length of the first mini-slot based on the resource allocation pattern, and receiving the downlink transmission based on the start time of the first mini-slot and the length of the first mini-slot.

A non-transitory computer-readable medium storing code for wireless communication at a UE is described. The code may include instructions executable by a processor to receive control information indicating a resource allocation pattern for a downlink transmission that is configured for transmission using a set of beams and a set of mini-slots, where a duration of a mini-slot is less than a duration of a slot, identify a start time of a first mini-slot of the set of mini-slots and a length of the first mini-slot based on the resource allocation pattern, and receive the downlink transmission based on the start time of the first mini-slot and the length of the first mini-slot.

Some examples of the method, apparatuses, and non-transitory computer-readable medium described herein may further include operations, features, means, or instructions for transmitting a report indicating a channel quality of the set of beams and receiving an indication of a set of TCI states corresponding to the set of beams based on the report.

In some examples of the method, apparatuses, and non-transitory computer-readable medium described herein, the indication includes RRC signaling.

Some examples of the method, apparatuses, and non-transitory computer-readable medium described herein may further include operations, features, means, or instructions for receiving a first portion of the downlink transmission on a first beam of the set of beams during the first mini-slot and switching to a second beam of the set of beams to receive a second portion of the downlink transmission during a second mini-slot of the set of mini-slots.

Some examples of the method, apparatuses, and non-transitory computer-readable medium described herein may further include operations, features, means, or instructions for determining a start time of a second mini-slot based on the length of the first mini-slot. Some examples of the method, apparatuses, and non-transitory computer-readable medium described herein may further include operations, features, means, or instructions for determining a length of a second mini-slot based on the length of the first mini-slot and a length of a slot encompassing the first mini-slot and the second mini-slot. Some cases of the method, apparatuses, and non-transitory computer-readable medium described herein may further include operations, features, means, or instructions for a combination thereof (e.g., determining the start time of the second mini-slot based on the length of the first mini-slot and determining the length of the second mini-slot based on the length of the first mini-slot and the length of the slot encompassing the first mini-slot and the second mini-slot.)

In some examples of the method, apparatuses, and non-transitory computer-readable medium described herein, a duration of each of the set of mini-slots may be equal to each other.

In some examples of the method, apparatuses, and non-transitory computer-readable medium described herein, the resource allocation pattern indicates the start time of the first mini-slot and the duration of the first mini-slot.

In some examples of the method, apparatuses, and non-transitory computer-readable medium described herein, a duration of the first mini-slot may be different than a duration of a second mini-slot, and where the duration of the first mini-slot and the duration of the second mini-slot may be based on a rate adjustment across the set of beams In some examples of the method, apparatuses, and non-transitory computer-readable medium described herein, the control information includes DCI.

In some examples of the method, apparatuses, and non-transitory computer-readable medium described herein, the resource allocation pattern includes a SLIV.

In some examples of the method, apparatuses, and non-transitory computer-readable medium described herein, the downlink transmission includes a PDSCH transmission.

In some examples of the method, apparatuses, and non-transitory computer-readable medium described herein, the start time for the first mini-slot includes an index for an orthogonal frequency division multiplexing (OFDM) symbol that starts the first mini-slot.

In some examples of the method, apparatuses, and non-transitory computer-readable medium described herein, the length for the first mini-slot includes a duration of OFDM symbols.

In some examples of the method, apparatuses, and non-transitory computer-readable medium described herein, the duration of the slot includes fourteen orthogonal frequency division multiplexing OFDM symbols if normal cyclic prefix (CP) is configured, and twelve OFDM symbols if extended CP is configured.

A method of wireless communication at base station is described. The method may include configuring a downlink transmission for transmission using a set of beams and a set of mini-slots, where a duration of a mini-slot is less than a duration of a slot, transmitting control information indicating a resource allocation pattern for the downlink transmission, and transmitting the downlink transmission based on the resource allocation pattern.

An apparatus for wireless communication at base station is described. The apparatus may include a processor, memory coupled to the processor, and instructions stored in the memory. The instructions may be executable by the processor to cause the apparatus to configure a downlink transmission for transmission using a set of beams and a set of mini-slots, where a duration of a mini-slot is less than a duration of a slot, transmit control information indicating a resource allocation pattern for the downlink transmission, and transmit the downlink transmission based on the resource allocation pattern.

Another apparatus for wireless communication at base station is described. The apparatus may include means for configuring a downlink transmission for transmission using a set of beams and a set of mini-slots, where a duration of a mini-slot is less than a duration of a slot, transmitting control information indicating a resource allocation pattern for the downlink transmission, and transmitting the downlink transmission based on the resource allocation pattern.

A non-transitory computer-readable medium storing code for wireless communication at base station is described. The code may include instructions executable by a processor to configure a downlink transmission for transmission using a set of beams and a set of mini-slots, where a duration of a mini-slot is less than a duration of a slot, transmit control information indicating a resource allocation pattern for the downlink transmission, and transmit the downlink transmission based on the resource allocation pattern.

Some examples of the method, apparatuses, and non-transitory computer-readable medium described herein may further include operations, features, means, or instructions for receiving a report indicating a channel quality of the set of beams and transmitting an indication of a set of TCI states corresponding to the set of beams based on the report.

In some examples of the method, apparatuses, and non-transitory computer-readable medium described herein, the indication includes RRC signaling.

Some examples of the method, apparatuses, and non-transitory computer-readable medium described herein may further include operations, features, means, or instructions for transmitting a first portion of the downlink transmission on a first beam of the set of beams during a first mini-slot of the set of mini-slots and transmitting a second portion of the downlink transmission on a second beam of the set of beams during a second mini-slot of the set of mini-slots.

Some examples of the method, apparatuses, and non-transitory computer-readable medium described herein may further include operations, features, means, or instructions for indicating a start time of a first mini-slot and a length of the first mini-slot based on the resource allocation pattern, where a start time of a second mini-slot and a length of the second mini-slot may be implicitly indicated based on the length of the first mini-slot and a length of a slot encompassing the first mini-slot and the second mini-slot.

Some examples of the method, apparatuses, and non-transitory computer-readable medium described herein may further include operations, features, means, or instructions for adjusting a transmission rate across the set of beams by configuring a duration of a first mini-slot of the set of mini-slots to be different than a duration of a second mini-slot of the set of mini-slots.

In some examples of the method, apparatuses, and non-transitory computer-readable medium described herein, the control information includes DCI.

In some examples of the method, apparatuses, and non-transitory computer-readable medium described herein, the resource allocation pattern includes a SLIV.

In some examples of the method, apparatuses, and non-transitory computer-readable medium described herein, the downlink transmission includes a PDSCH transmission.

In some examples of the method, apparatuses, and non-transitory computer-readable medium described herein, the duration of the slot includes fourteen OFDM symbols if normal CP is configured, and twelve OFDM symbols if extended CP is configured.

DETAILED DESCRIPTION

Figure 1:
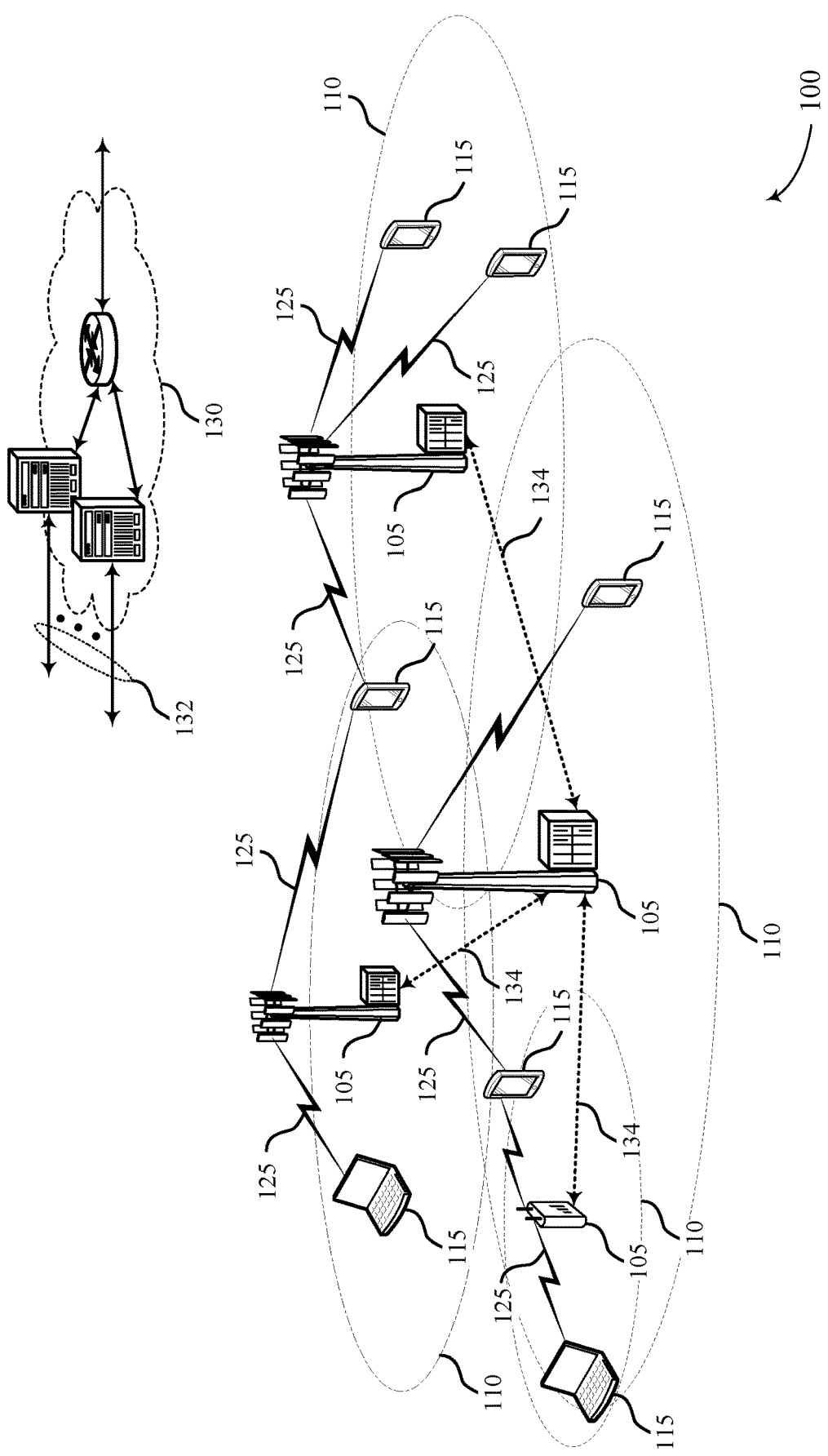
FIG. 1 illustrates an example of a system for wireless communications that supports resource allocation pattern signaling for mini-slots in accordance with aspects of the present disclosure.

In some wireless communications systems, uplink or downlink data in a slot may be independently decodable, without dependency or reliance on other slots. Further, a slot may be complemented by one or more mini-slots to support transmissions with a start position that is flexible in time, and a duration shorter than a regular slot duration. It should be noted that the term mini-slot as used herein, may be referred to as a subset of a slot, and may comprise a group of orthogonal frequency division multiplexing (OFDM) symbols within the slot. In some cases, the duration of a slot or mini-slot may be based on a chosen numerology, since the OFDM symbol duration may be inversely proportional to its subcarrier spacing. In some cases, a scalable OFDM numerology may be implemented to enable diverse service on a wide range of frequencies and deployments. For instance, subcarrier spacing may be scalable by a factor of $2^n$, which may serve to ensure that slots and symbols of different numerologies are aligned in the time domain. In some aspects, the number of OFDM symbols for a slot in a new radio (NR) system may be 7 or 14, if normal cyclic prefix (CP) is configured, and 12 if extended CP is configured.

Some wireless communications, such as those deploying NR technologies or operating in millimeter wave (mmW) spectrum, may utilize beamforming techniques to increase the strength of wireless signals in particular directions to address additional attenuation experienced in the mmW spectrum. In some cases, a UE may be configured with one or more transmission configuration indication (TCI) states, and downlink data may be mapped across the one or more TCI states.

In some cases, a UE scheduled to receive downlink data over a shared channel (e.g., physical downlink shared channel (PDSCH), or NR-PDSCH) may receive control information providing a row index of a higher layer (e.g., radio resource control (RRC)) configured table, the indexed row defining a slot offset $K_0$, start and length indicator (SLIV), and a PDSCH mapping type to be assumed for the PDSCH reception. In some cases, the slot allocated for the PDSCH may be determined by $K_0$ of the indexed row $n+K_0$, where n may be the slot comprising the scheduling downlink control information (DCI), and $K_0$ may be based on the numerology of the PDSCH. In some cases, the starting symbol S relative to the start of the slot, and the number of consecutive symbols L counting from the symbol S allocated for the PDSCH may be determined from the start and length indicator SLIV of the indexed row.

In some cases, the UE may be configured with one or more TCI states, and downlink data may be mapped across the one or more TCI states. For a system deploying beamforming, each beam (e.g., each analog beam) may be considered as a separate TCI state. Further, a base station and UE may be capable of switching between TCI states within the duration of a slot. Techniques for configuring SLIV patterns at the slot level may be inadequate for supporting multiple TCI state based PDSCH reception. As such, SLIV patterns for mini-slot level aggregation may be desired.

In some cases, the DCI may convey one of the SLIV patterns configured by the base station. Further, the mode of operation (e.g., multiple TCI state based PDSCH transmission) may be determined by the base station, and enabled via RRC signaling. In some cases, the base station may determine the mode of operation based on receiving a report indicating a channel quality of the plurality of beams from the UE. The UE may receive an indication of a plurality of TCI states corresponding to the plurality of beams based on the channel quality report. Further, different SLIV patterns at the mini-slot level may allow for rate-adjustments across the different TCI states. For instance, the base station may decide to allocate more resources for a particular TCI state over another. In an example of mini-slot level aggregation, a slot may comprise two mini-slots, each associated with a different TCI state (e.g., different beams). Further, the SLIV pattern for a second mini-slot may be implicitly derived from the SLIV pattern for the first mini-slot.

In some other cases, a slot may comprise multiple mini-slots (e.g., two or more) of the same duration. Further, each of the multiple mini-slots may be associated with a TCI state. In such cases, the network may not need to indicate a SLIV pattern for each individual mini-slot, since the length indicator L and start indicator S of the first mini-slot may be used to derive the start indicators for each of the subsequent mini-slots. Alternatively, $K_0$ may be modified to be a vector comprising the start indicators S for each of the multiple mini-slots.

Aspects of the disclosure are initially described in the context of a wireless communications system. Aspects of the disclosure are further illustrated by and described with reference to a communications message, a process flow diagram, apparatus diagrams, system diagrams, and flowcharts that relate to resource allocation pattern signaling for mini-slots.

FIG. 1 illustrates an example of a wireless communications system 100 that supports resource allocation pattern signaling for mini-slots in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or an NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 \ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). In some examples (e.g., in NR systems), a slot may include fourteen OFDM symbols if normal CP is configured and twelve OFDM symbols if extended CP is configured. Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more OFDM symbols. The duration of a mini-slot may be less than the duration of a slot. For example, if the slot duration is configured as 14 OFDM symbols, the duration of a mini-slot may be less than 14 OFDM symbols. Multiple mini-slots within a slot may have the same or different durations as each other. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some cases, a base station 105 may be capable of configuring SLIV patterns at the mini-slot level. In some cases, the base station 105 may determine a mode of operation based on a CQI report, or another UE feedback report. For instance, a UE 115 may transmit a report indicating a channel quality for a plurality of beams, and may receive an indication of a plurality of TCI states corresponding to the plurality of beams.

In some cases, in addition to receiving an indication of the TCI states from the base station 105, the UE 115 may also receive control information (e.g., DCI) carried over a downlink control channel. In some cases, the DCI may comprise a time-domain PDSCH resources field, which may provide a row index of a higher layer configured table. The row index may assist the UE 115 in determining resources over which the downlink data may be received, including SLIV patterns. In some cases, the SLIV pattern may provide an indication of a start time and a length of a first mini-slot, based on which the UE 115 may be able to implicitly derive start times and lengths of one or more other mini-slots. In some cases, if a number of mini-slots encompassed by a slot exceeds two, and the mini-slots are equal in duration, a slot offset $K_0$ may comprise a vector indicating start indicators (S) for the plurality of mini-slots. In some other cases, if the number of mini-slots equals two (2), the SLIV pattern for the second mini-slot may be implicitly derived from the SLIV pattern for the first mini-slot. In some cases, the first mini-slot and the second mini-slot may differ in duration, which may be based on a rate adjustment across the plurality of beams. For instance, the base station 105 may decide to allocate more resources for a particular TCI state over another.

Figure 2:
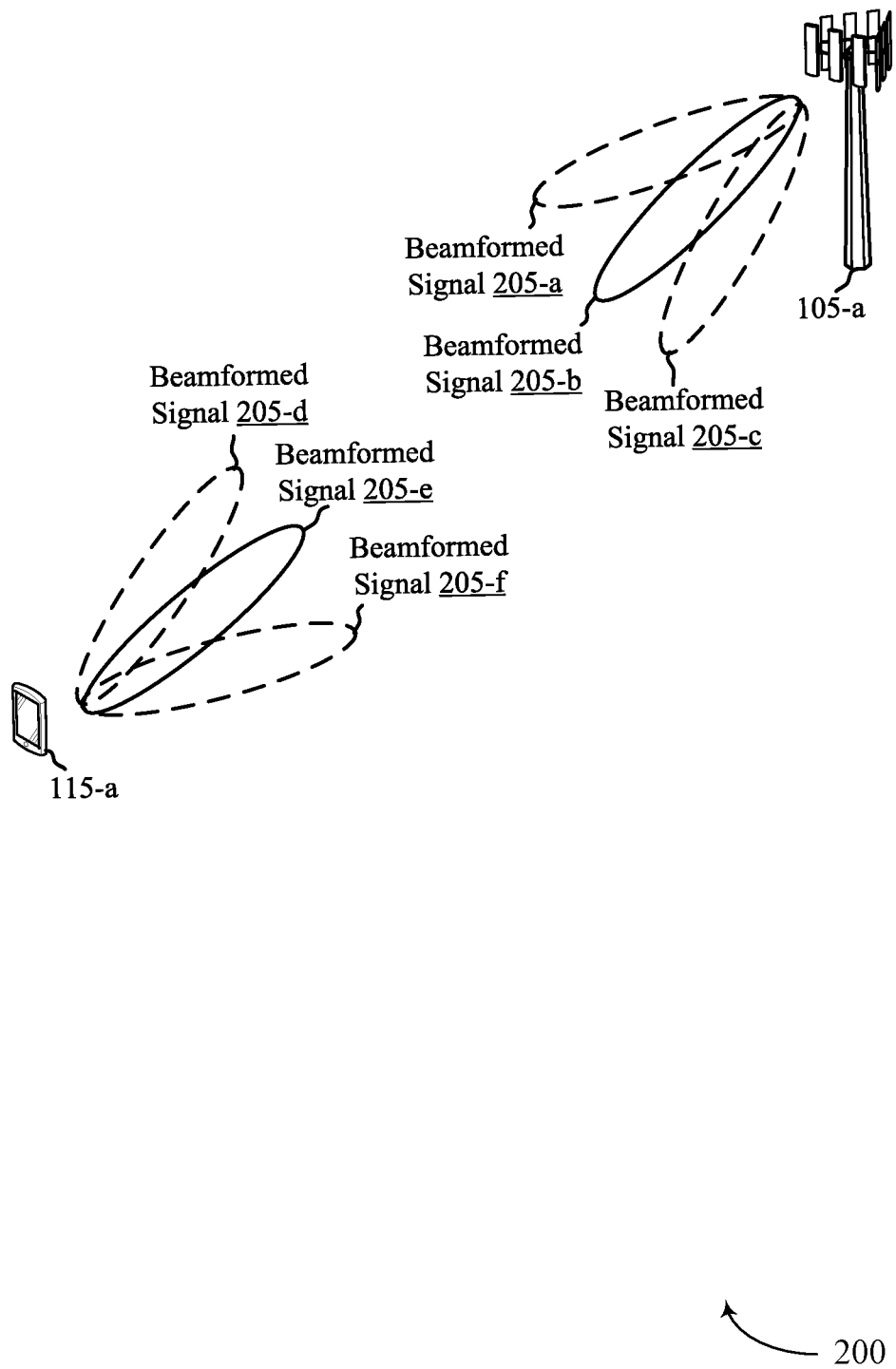
FIG. 2 illustrates an example of a system for wireless communications that supports resource allocation pattern signaling for mini-slots in accordance with aspects of the present disclosure.

FIG. 2 illustrates an example of a wireless communications system 200 that supports resource allocation pattern signaling for mini-slots in accordance with aspects of the present disclosure. In some examples, wireless communications system 200 may implement aspects of wireless communications system 100, and may include a UE 115-*a* and a base station 105-*a*, which may be examples of the UE 115 and base station 105 described with reference to FIG. 1. UE 115-*a* and base station 105-*a* may communicate using directional beams and may operate using mmW spectrum, for example. In some cases, the UE 115-*a* and base station 105-*a* may operate in a spectrum other than the mmW spectrum (e.g., a spectrum with frequencies below six GHz (sub-6 GHz)).

In some cases, base station 105-*a* and/or UE 115-*a* may utilize beamforming techniques to increase the strength of wireless signals as a result of additional path loss. For example, base station 105-*a* may transmit a plurality of downlink beamformed signals 205 that carry data and/or control information. Beamformed signals 205 (e.g., beamformed signal 205-*a*, beamformed signal 205-*b*, or beamformed signal 205-*c*) may be transmitted in a shaped or directional manner where each beamformed signal 205 is transmitted in a different direction and may be considered to be a TCI state. Beamformed signals 205 may be associated with an antenna port precoder configuration (e.g., an analog and/or digital beamforming stage that determines the direction and/or shape of each beamformed signal 205). For example, beamformed signal 205-*a* may be transmitted in a first direction or shape, beamformed signal 205-*b* may be transmitted in a second direction or shape, and beamformed signal 205-*c* may be transmitted in a third direction or shape. The beamformed signals 205 may be transmitted in a sweeping pattern. In addition, UE 115-*a* may transmit and base station 105-*a* may receive one or more beamformed signals 205 (e.g., beamformed signal 205-*d*, beamformed signal 205-*e*, and beamformed signal 205-*f*).

In some cases, UE 115-*a* may be scheduled to receive downlink data over a downlink shared channel, such as a PDSCH, or a NR-PDSCH. In some cases, the PDSCH resource allocation may be indicated via DCI carried on a downlink control channel (e.g., Physical Downlink Control Channel (PDCCH), or NR-PDCCH). In some cases, the DCI may comprise a time-domain PDSCH resources field, which may provide a row index of a higher layer (e.g., RRC) configured table. The row index may assist the UE 115-*a* in determining the time or frequency resources over which the downlink data may be received. For instance, the indexed row may define a slot offset $K_0$, and start and length indicator SLIV. As previously described, downlink data scheduled for the UE 115-*a* may be received over a plurality of TCI states corresponding to the one or more downlink beamformed signals 205. Although the example described with reference to FIG. 2 is in reference to resource allocation patterns for the reception of downlink data, it should be understood that the resource allocation pattern techniques described herein may also be applied to scheduling uplink transmissions.

In some cases, the UE 115-*a* may receive one or more of the plurality of beamformed signals 205 transmitted from the base station 105-*a*. In some cases, base station 105-*a* may perform SLIV configuration at a mini-slot level. The UE 115-a may transmit a report indicating a channel quality of the plurality of beamformed signals 205, upon which it may receive an indication of a plurality of TCI states corresponding to the plurality of beams. The slot allocated for the PDSCH may be determined by $K_0$ of the indexed row n+$K_0$, where n may be the slot comprising the scheduling DCI, and $K_0$ may be based on the numerology of the PDSCH. In some cases, the starting symbol S for the first mini-slot relative to the start of the slot within which it is located and the number of consecutive symbols L counting from the symbol S allocated for the PDSCH may be determined from the start and length indicator SLIV of the indexed row. Different SLIV patterns at the mini-slot level may allow for rate-adjustments across the different TCI states. For instance, the base station 105-a may decide to allocate more time domain resources for a particular TCI state over another. In some cases, the UE 115-a may determine the start and duration of subsequent mini-slots based on the SLIV pattern of the first mini-slot. This may alleviate the need for the base station 105-a or the network to indicate a SLIV pattern for each individual mini-slot, which may limit overhead associated with explicit indications, as further described below with reference to FIG. 3.

Figure 3:
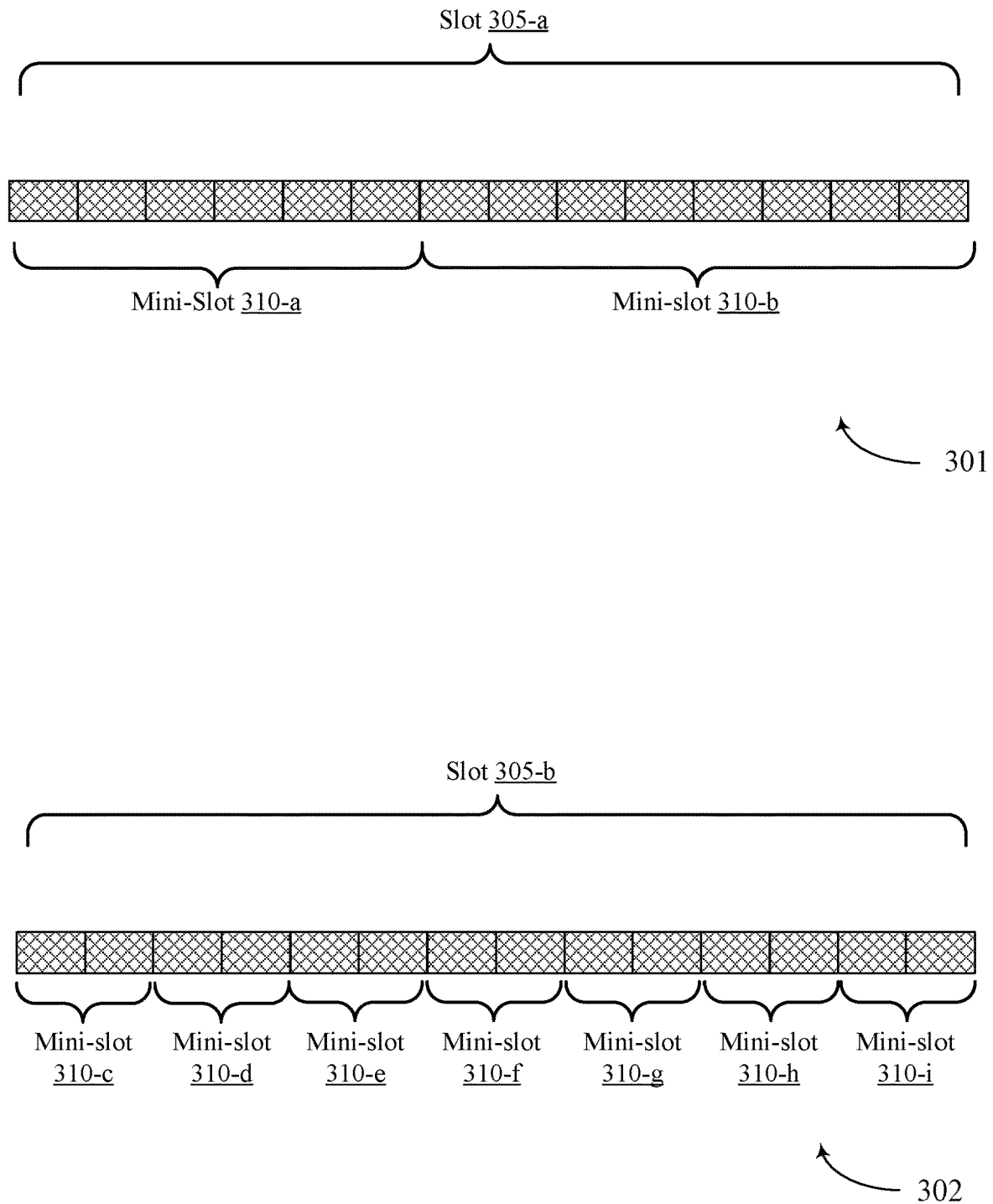
FIG. 3 illustrates an example of a wireless communications message that supports resource allocation pattern signaling for mini-slots in accordance with aspects of the present disclosure.

FIG. 3 illustrates examples of wireless communications messages 301 and 302 that support resource allocation pattern signaling for mini-slots in accordance with aspects of the present disclosure. The wireless communications message 301 may be transmitted over a slot 305-a. The slot 305-a may be divided into one or more time increments (e.g., OFDM symbols). In this example, slot 305-a includes 14 OFDM symbols. However, it should be understood that other increments of time may be used, depending on the type of slot or type of wireless system employed. In some cases, as illustrated, the slot 305-a may be further divided into one or more mini-slots 310 (e.g., mini-slot 310-a and mini-slot 310-b). Mini-slot 310-a may have a duration of 6 OFDM symbols, and mini-slot 310-b may have a duration of 8 OFDM symbols. It should be understood that the slot 305-a described with reference to FIG. 3 may also be applied to slots and mini-slots used for uplink or downlink communications.

Wireless communications message 301 may illustrate an example of an implicit determination of SLIV pattern at the mini-slot level. For example, the SLIV pattern for the second mini-slot 310-b may be implicitly derived from the SLIV pattern for the first mini-slot 310-a. A UE (e.g., UE 115 as described with reference to FIGS. 1 and 2) may receive a DCI message conveying S and L for the first SLIV pattern. In the example shown, S is 0, and L is 6 for the first mini-slot 310-a. The UE may use this information to implicitly determine the start and duration of the second mini-slot 310-b. For example, the start indicator for the second mini-slot 310-b may be determined from S+L, which would yield 6 in this example. The length for the second mini-slot 310-b may be determined from (N−L), where N is the total number of symbols configured for a slot (which is 14 in this example). Therefore, the length for the second mini-slot 310-b in this example would be implicitly determined by the UE as 8. Other techniques for determining the start and length of subsequent mini-slots may also be utilized by the UE. For example, if the starting location of the first mini-slot 310-a was something other than 0, then the UE may determine the length of the second mini-slot 310-b by determining how many OFDM symbols remain in the slot 305-a (if the second mini-slot 310-b is to end at the slot boundary).

Wireless communications message 302 may illustrate another example of an implicit determination of SLIV pattern at the mini-slot level. As depicted, slot 305-b may comprise multiple mini-slots 310 (e.g., mini-slots 310-c, 310-d, 310-e, 310-e, 310-f, 310-g, 310-h, and 310-i), each of which may be of the same length (i.e., 2 OFDM symbols in this example), and associated with a respective TCI state. In some cases, the network or a base station (e.g., a base station 105 as described with reference to FIGS. 1 and 2) may not need to indicate a pattern for the multiple mini-slots, since the length indicator L and start indicator S of the first mini-slot may be used to derive the start indicators for each of the subsequent mini-slots (i.e., S+L, S+2L, etc.). Alternatively, $K_0$ may be modified to be a vector of the start indicators (i.e., S+L, S+2L, etc.,) for each of the multiple mini-slots 310.

In some cases, mini-slots 310-a and 310-b may each be associated with a different TCI state, allowing PDSCH reception over multiple TCI states. For instance, downlink data may be mapped across the TCI states associated with mini-slots 310-c through 310-i. In some cases, the UE may receive one or more portions of the downlink data transmission on a first beam of the plurality of beams during one or more of mini-slots 310-c through 310-i. Further, the UE may switch to a second beam from the plurality of beams in order to receive one or more additional portions of the downlink data transmission on the second beam. Here, the UE may receive the one or more additional portions of the downlink data transmission during the subsequent mini-slot 310. It should be understood that the base station may utilize techniques described herein to flexibly schedule any number of mini-slots 310 for reception on any number of beams (or TCI states), and may indicate the associated resource allocation patterns to a UE in a manner that reduces the signaling overhead (e.g., may indicate via DCI the SLIV pattern for a first mini-slot 310 such that the UE may imply the start and durations of the subsequent one or more mini-slots 310).

Figure 4:
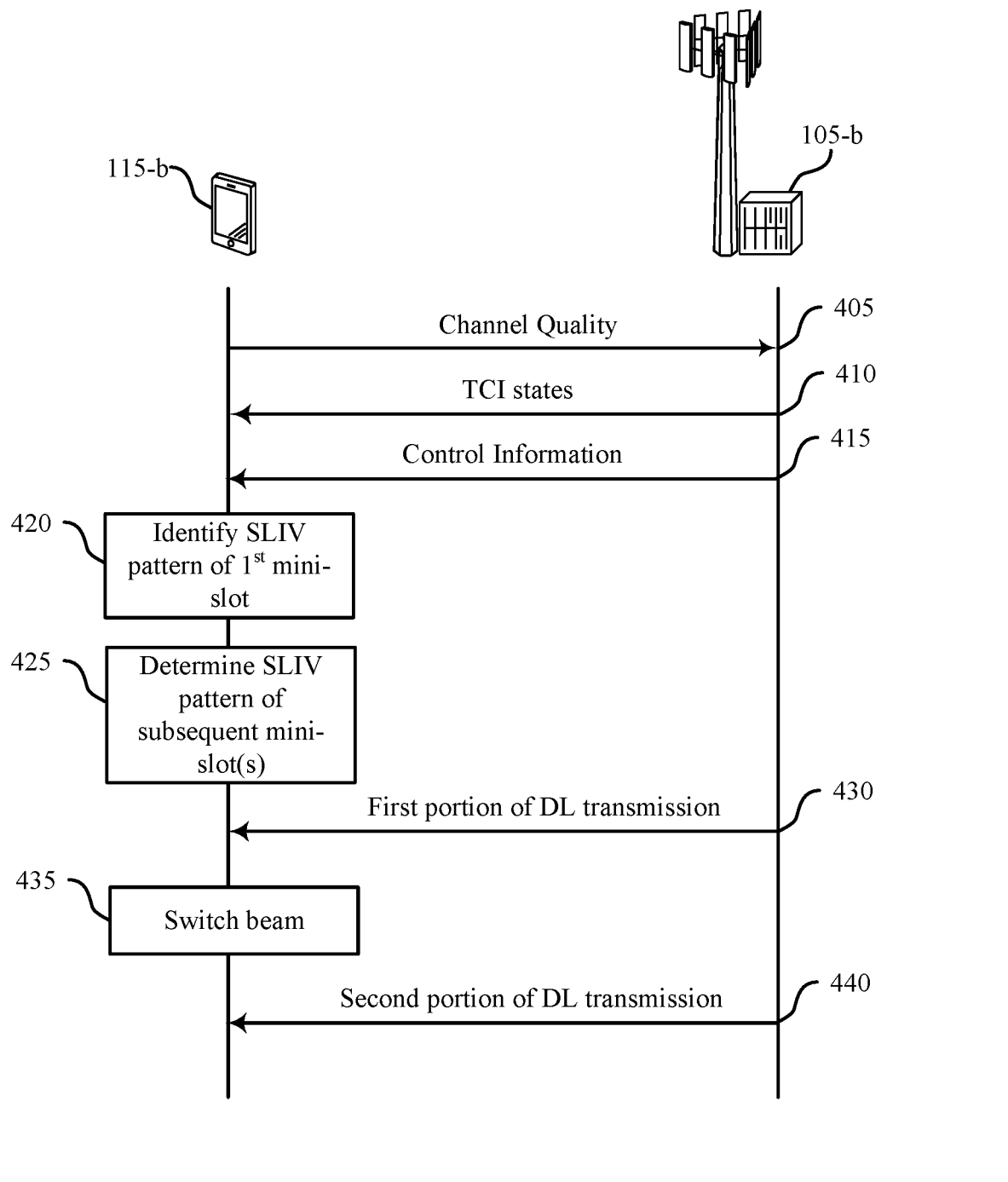
FIG. 4 illustrates an example of a process flow in accordance with aspects of the present disclosure.

FIG. 4 illustrates an example of a process flow 400 that supports resource allocation pattern signaling for mini-slots in accordance with aspects of the present disclosure. In some examples, the process illustrated by process flow 400 may be implemented by a UE 115-b and a base station 105-b, which may be examples of a UE 115 and base station 105, as described with reference to FIGS. 1 and 2. In some examples, the process illustrated by process flow 400 may be implemented in a wireless system employing mmW communications or a sub-6 GHz spectrum.

At 405, UE 115-b may transmit a report indicating a channel quality of a plurality of beams that have been configured for transmission. This process may be part of a periodic or a-periodic process, a beam synchronization process, or some other similar process, and may include a report such as a channel quality indicator report.

At 410, base station 105-b may transmit, and UE 115-b may receive, an indication of a plurality of TCI states corresponding to the plurality of beams based on the report. For example, the indication of the TCI states may configure a plurality of different beams (e.g., different analog beams) for beamformed communication between the UE 115-b and base station 105-b. In some cases, the indication may comprise RRC signaling or some other higher layer signaling.

At 415, UE 115-b may receive control information indicating a resource allocation pattern (e.g., start and length indicator) for a downlink transmission configured for transmission using a plurality of beams and a plurality of mini-slots. As described above, a duration of a mini-slot may be less than a duration of a slot. The control information may be transmitted via DCI or some other downlink control information.

At 420, the UE 115-b may identify a start time of a first mini-slot of the plurality of mini-slots and a length of the first mini-slot based on the resource allocation pattern.

At 425, UE 115-b may determine a start time and length of a second mini-slot (or a plurality of subsequent mini-slots) based on the length of the first mini-slot and a length of a slot encompassing the first mini-slot and the second mini-slot. In some cases, the duration of the first mini-slot may be different than a duration of the second mini-slot, where the durations of the two mini-slots may be based on a rate adjustment across the plurality of beams. In other cases, the duration of the two or more mini-slots may be the same.

At 430, the UE 115-b may receive a first portion of the downlink transmission on a first beam of the plurality of beams during the first mini-slot, and based at least on the start time of the first mini-slot and the length of the first mini-slot.

In some cases, at 435, the UE 115-b may switch to a second beam of the plurality of beams to receive a second portion of the downlink transmission during the second mini-slot. The number of beam switches and the number or portions of the downlink transmission (as well as the number of mini-slots) may all be flexibly configured and signaled by the base station 105-b in accordance with the techniques described herein.

At 440, the UE 115-b may receive the second portion of the downlink transmission during the second mini-slot.

Figure 5:
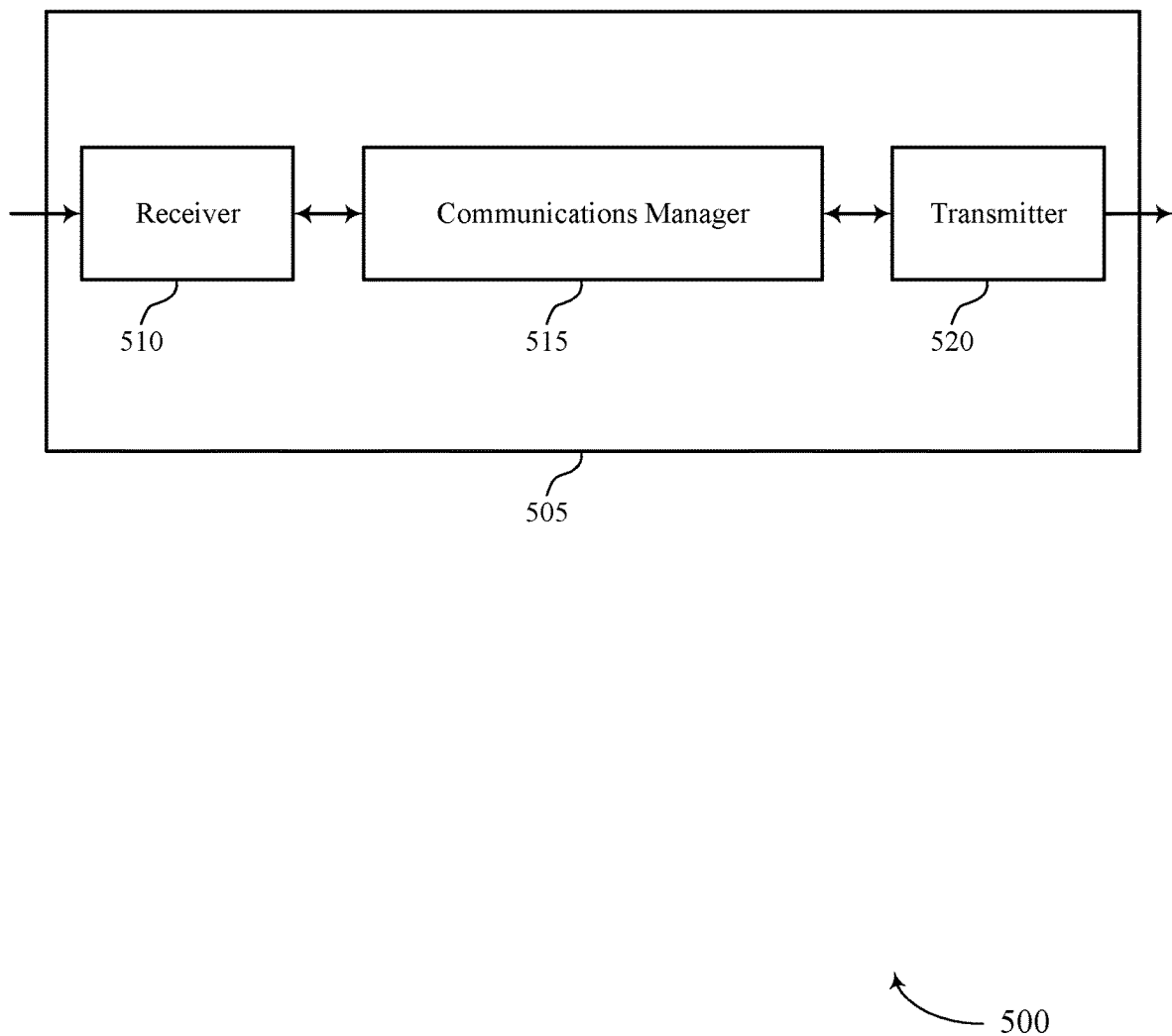
FIGS. 5 and 6 show block diagrams of devices that support resource allocation pattern signaling for mini-slots in accordance with aspects of the present disclosure.

FIG. 5 shows a block diagram 500 of a device 505 that supports resource allocation pattern signaling for mini-slots in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to resource allocation pattern signaling for mini-slots, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may receive control information indicating a resource allocation pattern for a downlink transmission that is configured for transmission using a set of beams and a set of mini-slots, where a duration of a mini-slot is less than a duration of a slot, identify a start time of a first mini-slot of the set of mini-slots and a length of the first mini-slot based on the resource allocation pattern, and receive the downlink transmission based on the start time of the first mini-slot and the length of the first mini-slot. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
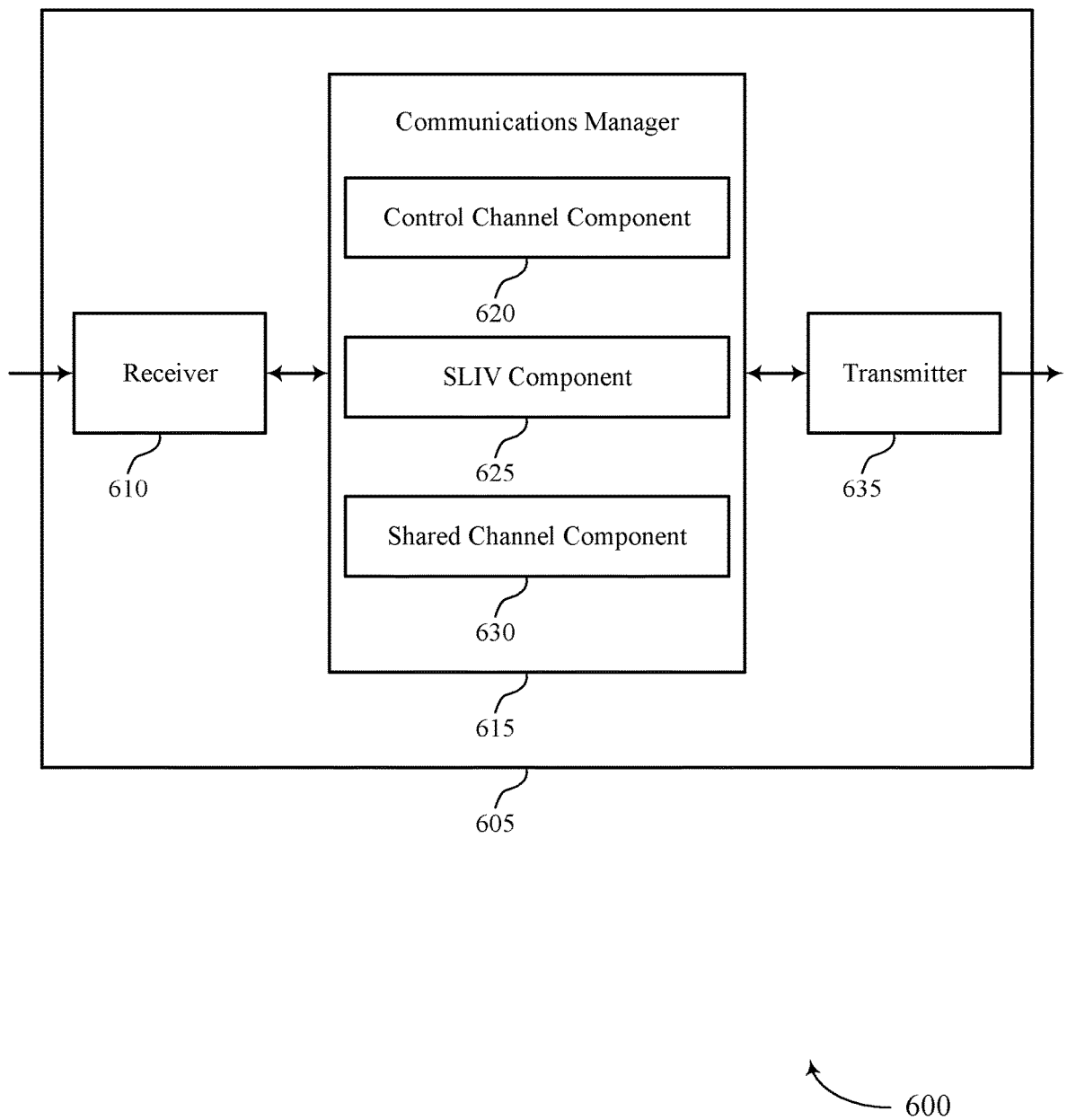

FIG. 6 shows a block diagram 600 of a device 605 that supports resource allocation pattern signaling for mini-slots in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to resource allocation pattern signaling for mini-slots, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a control channel component 620, a SLIV component 625, and a shared channel component 630. The communications manager 615 may be an example of aspects of the communications manager 810 described herein.

The control channel component 620 may receive control information indicating a resource allocation pattern for a downlink transmission that is configured for transmission using a set of beams and a set of mini-slots, where a duration of a mini-slot is less than a duration of a slot.

The SLIV component 625 may identify a start time of a first mini-slot of the set of mini-slots and a length of the first mini-slot based on the resource allocation pattern.

The shared channel component 630 may receive the downlink transmission based on the start time of the first mini-slot and the length of the first mini-slot.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
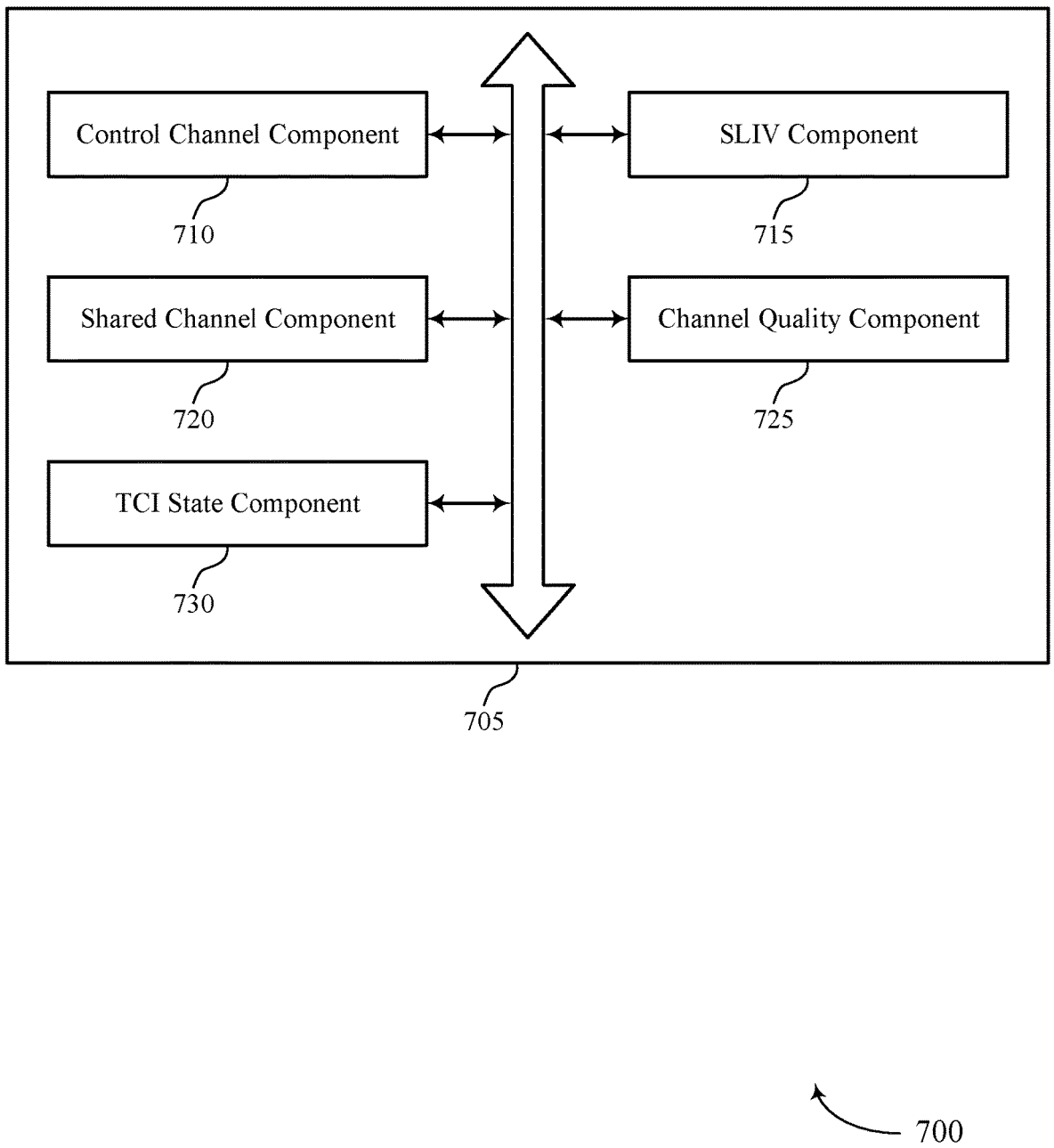
FIG. 7 shows a block diagram of a communications manager that supports resource allocation pattern signaling for mini-slots in accordance with aspects of the present disclosure.

FIG. 7 shows a block diagram 700 of a communications manager 705 that supports resource allocation pattern signaling for mini-slots in accordance with aspects of the present disclosure. The communications manager 705 may be an example of aspects of a communications manager 515, a communications manager 615, or a communications manager 810 described herein. The communications manager 705 may include a control channel component 710, a SLIV component 715, a shared channel component 720, a channel quality component 725, and a TCI state component 730. Each of these modules may communicate, directly or indirectly, with one another (e.g., via one or more buses).

The control channel component 710 may receive control information indicating a resource allocation pattern for a downlink transmission that is configured for transmission using a set of beams and a set of mini-slots, where a duration of a mini-slot is less than a duration of a slot. In some cases, the control information includes DCI.

The SLIV component 715 may identify a start time of a first mini-slot of the set of mini-slots and a length of the first mini-slot based on the resource allocation pattern.

In some examples, the SLIV component 715 may determine a start time of a second mini-slot based on the length of the first mini-slot.

In some examples, the SLIV component 715 may determine a length of a second mini-slot based on the length of the first mini-slot and a length of a slot encompassing the first mini-slot and the second mini-slot.

In some cases, a duration of each of the set of mini-slots are equal to each other.

In some cases, the resource allocation pattern indicates the start time of the first mini-slot and the duration of the first mini-slot.

In some cases, a duration of the first mini-slot is different than a duration of a second mini-slot, where the duration of the first mini-slot and the duration of the second mini-slot are based on a rate adjustment across the set of beams. In some cases, the resource allocation pattern includes a start and length indicator. In some cases, the start time for the first mini-slot includes an index for an OFDM symbol that starts the first mini-slot. In some cases, the length for the first mini-slot includes a duration of OFDM symbols.

In some cases, the duration of the slot includes fourteen OFDM symbols if normal CP is configured and twelve OFDM symbols if extended CP is configured.

The shared channel component 720 may receive the downlink transmission based on the start time of the first mini-slot and the length of the first mini-slot. In some examples, the shared channel component 720 may receive a first portion of the downlink transmission on a first beam of the set of beams during the first mini-slot. In some cases, the downlink transmission includes a PDSCH transmission.

The channel quality component 725 may transmit a report indicating a channel quality of the set of beams.

The TCI state component 730 may receive an indication of a set of TCI states corresponding to the set of beams based on the report. In some examples, the TCI state component 730 may switch to a second beam of the set of beams to receive a second portion of the downlink transmission during a second mini-slot of the set of mini-slots. In some cases, the indication includes RRC signaling.

Figure 8:
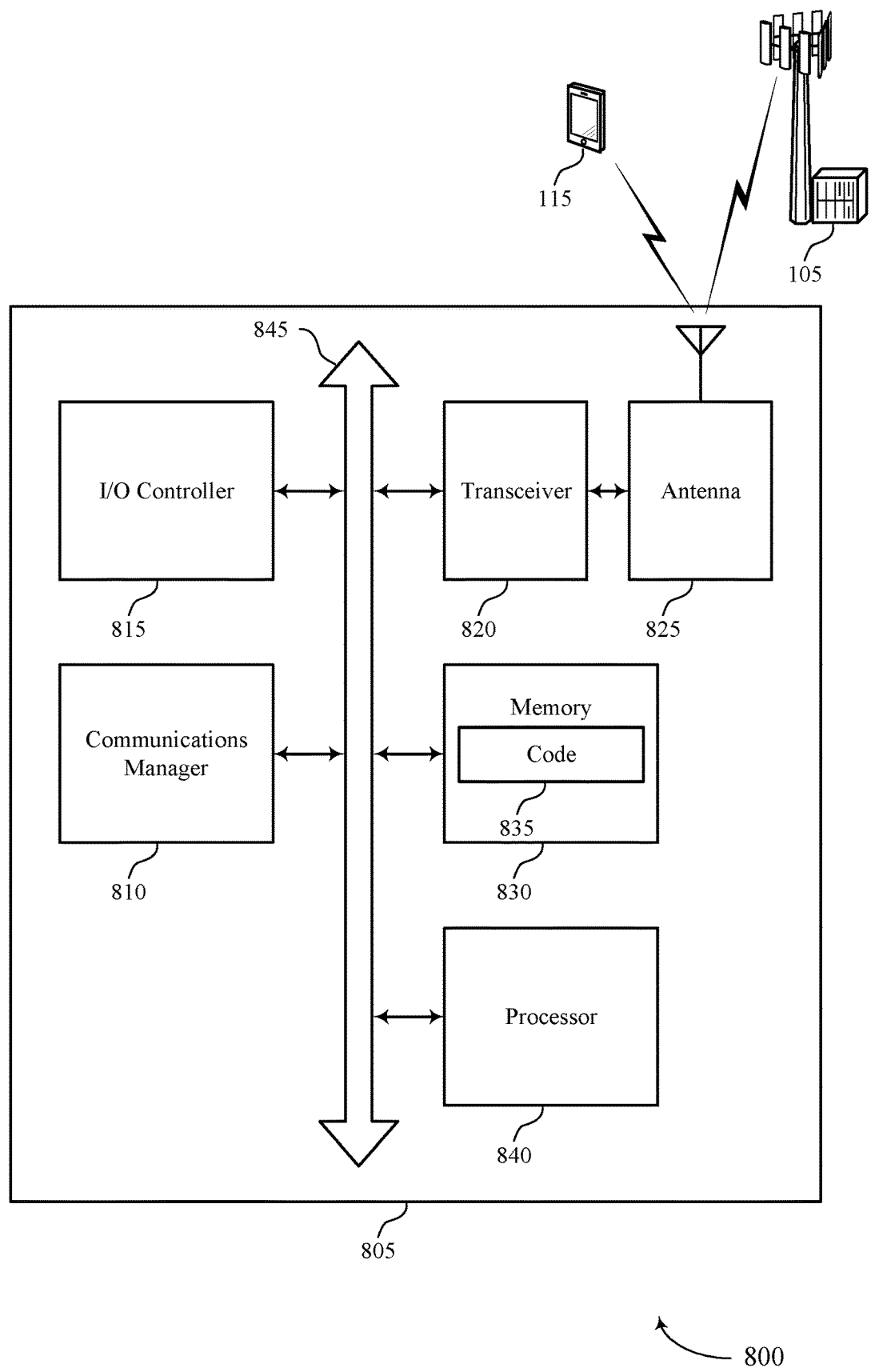
FIG. 8 shows a diagram of a system including a device that supports resource allocation pattern signaling for mini-slots in accordance with aspects of the present disclosure.

FIG. 8 shows a diagram of a system 800 including a device 805 that supports resource allocation pattern signaling for mini-slots in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may receive control information indicating a resource allocation pattern for a downlink transmission that is configured for transmission using a set of beams and a set of mini-slots, where a duration of a mini-slot is less than a duration of a slot, identify a start time of a first mini-slot of the set of mini-slots and a length of the first mini-slot based on the resource allocation pattern, and receive the downlink transmission based on the start time of the first mini-slot and the length of the first mini-slot.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting resource allocation pattern signaling for mini-slots).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
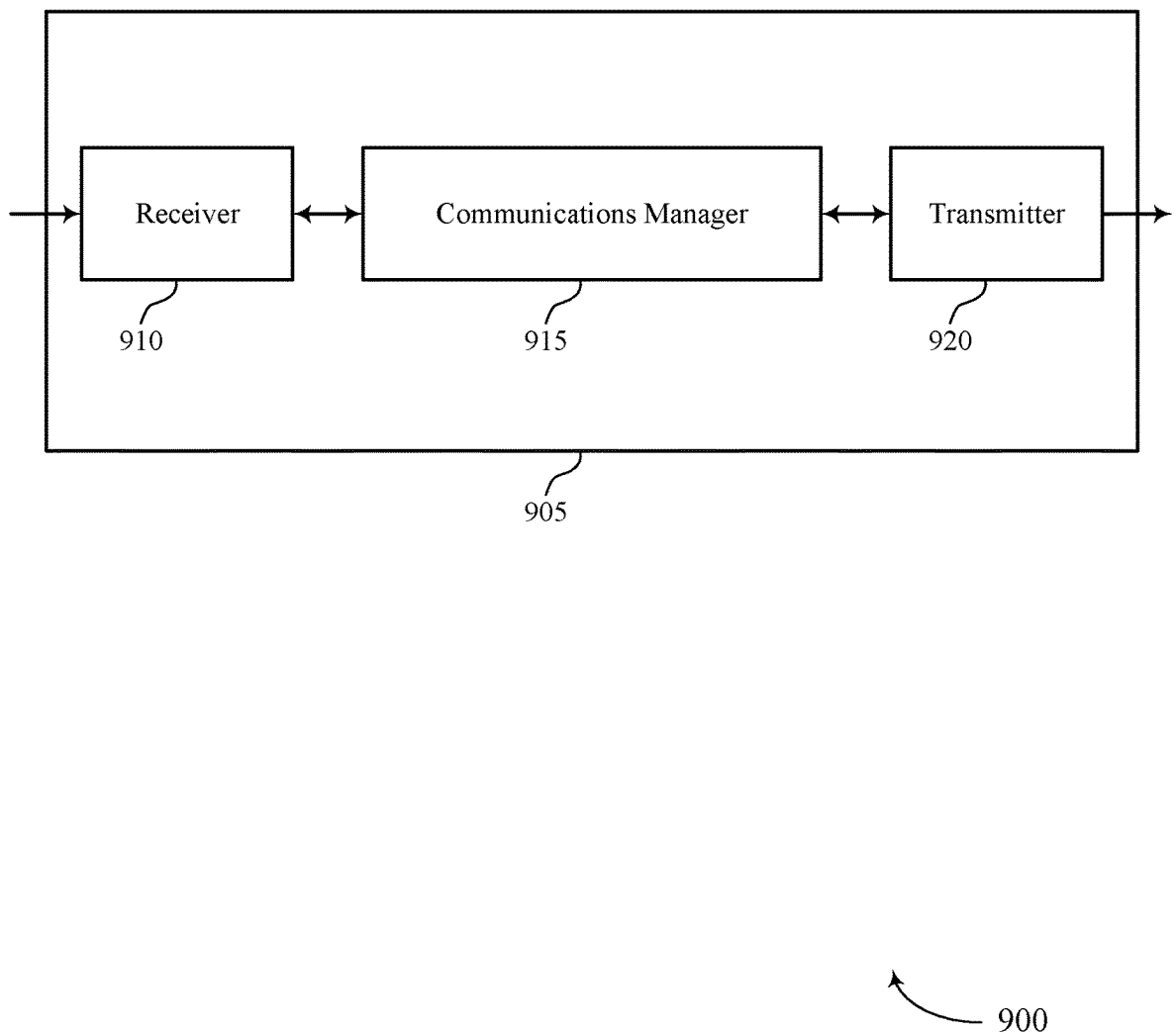
FIGS. 9 and 10 show block diagrams of devices that support resource allocation pattern signaling for mini-slots in accordance with aspects of the present disclosure.

FIG. 9 shows a block diagram 900 of a device 905 that supports resource allocation pattern signaling for mini-slots in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to resource allocation pattern signaling for mini-slots, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may configure a downlink transmission for transmission using a set of beams and a set of mini-slots, where a duration of a mini-slot is less than a duration of a slot, transmit control information indicating a resource allocation pattern for the downlink transmission, and transmit the downlink transmission based on the resource allocation pattern. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
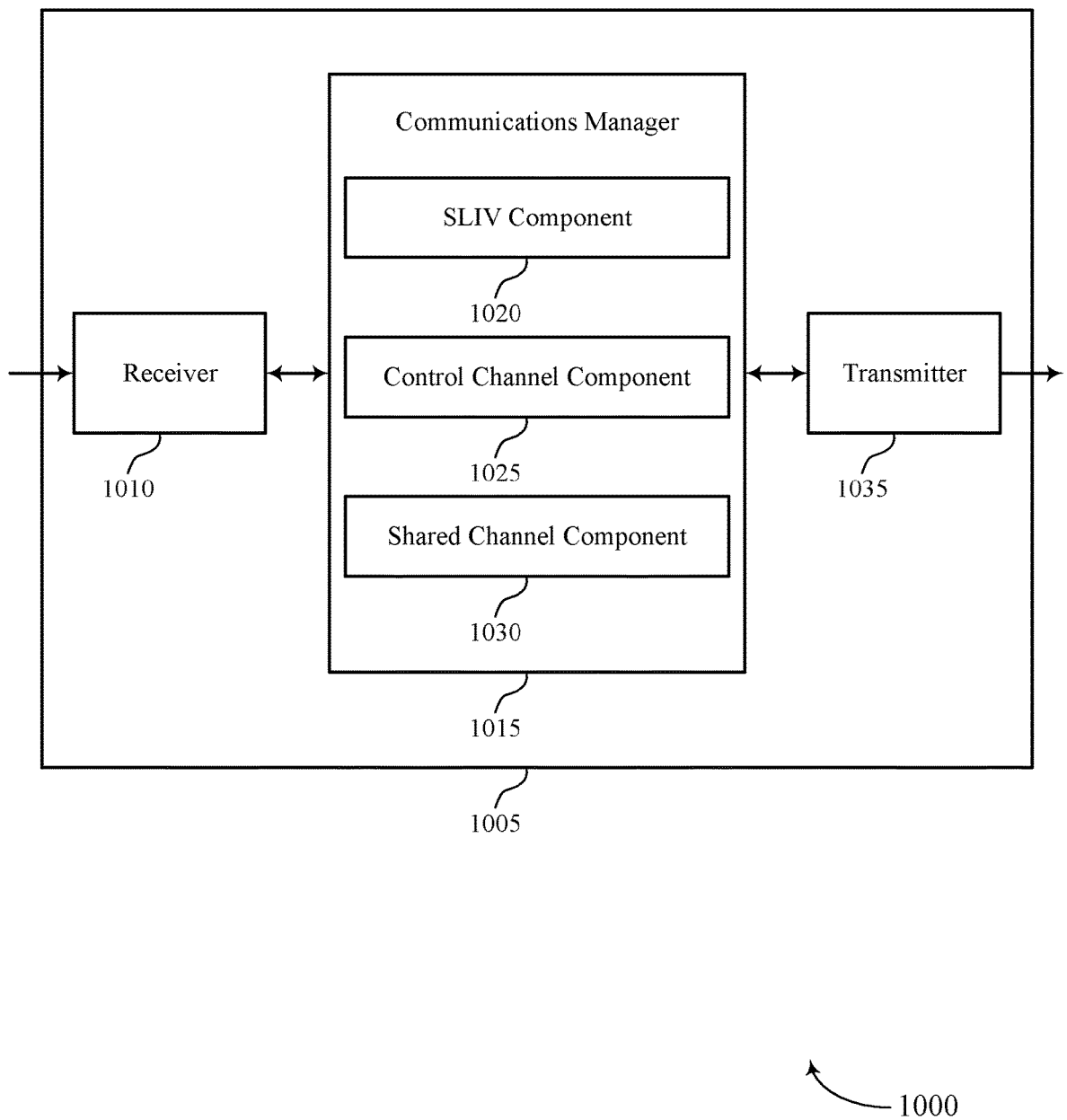

FIG. 10 shows a block diagram 1000 of a device 1005 that supports resource allocation pattern signaling for mini-slots in accordance with aspects of the present disclosure. The device 1005 may be an example of aspects of a device 905 or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to resource allocation pattern signaling for mini-slots, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a SLIV component 1020, a control channel component 1025, and a shared channel component 1030. The communications manager 1015 may be an example of aspects of the communications manager 1210 described herein.

The SLIV component 1020 may configure a downlink transmission for transmission using a set of beams and a set of mini-slots, where a duration of a mini-slot is less than a duration of a slot.

The control channel component 1025 may transmit control information indicating a resource allocation pattern for the downlink transmission.

The shared channel component 1030 may transmit the downlink transmission based on the resource allocation pattern.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
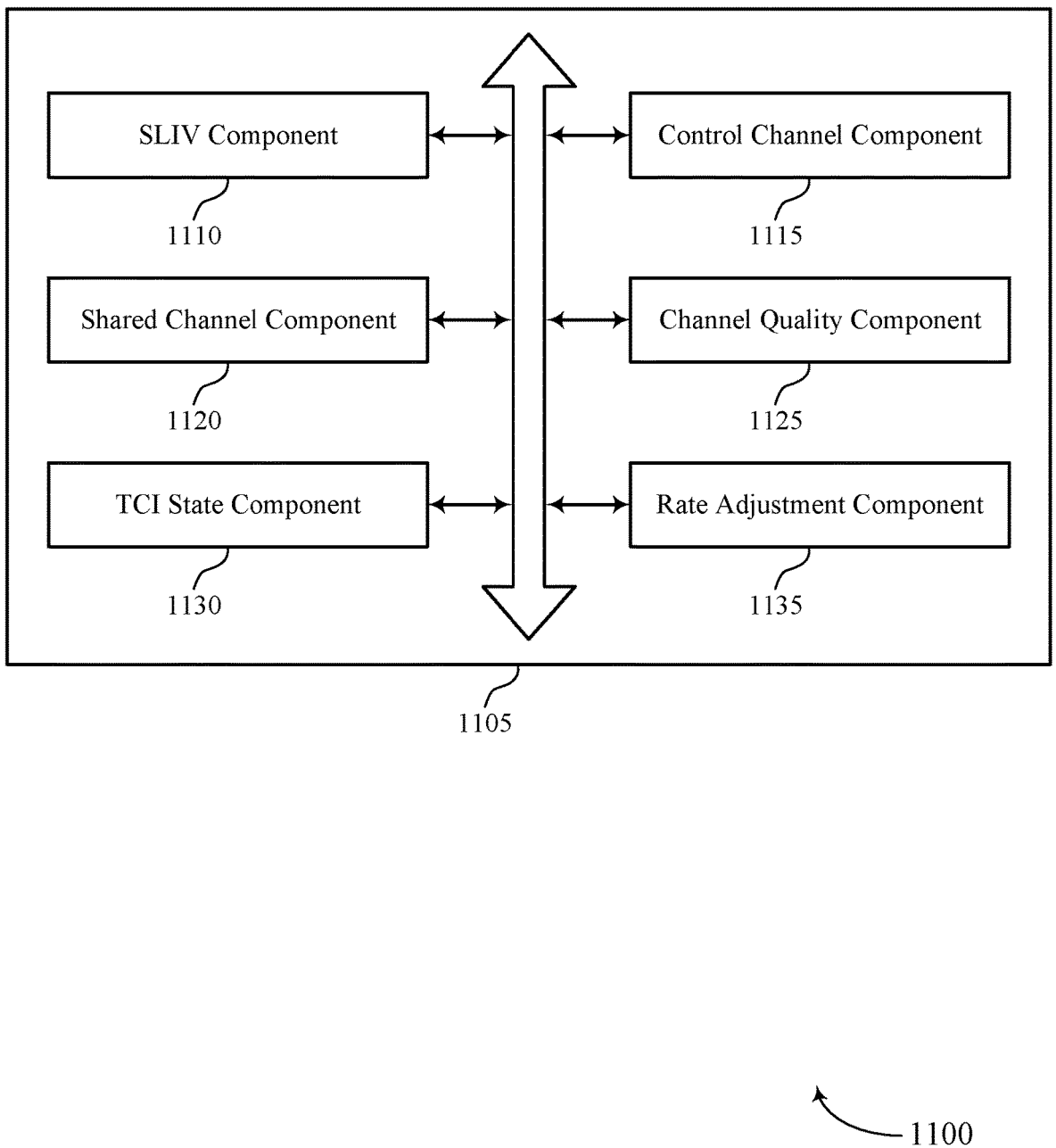
FIG. 11 shows a block diagram of a communications manager that supports resource allocation pattern signaling for mini-slots in accordance with aspects of the present disclosure.

FIG. 11 shows a block diagram 1100 of a communications manager 1105 that supports resource allocation pattern signaling for mini-slots in accordance with aspects of the present disclosure. The communications manager 1105 may be an example of aspects of a communications manager 915, a communications manager 1015, or a communications manager 1210 described herein. The communications manager 1105 may include a SLIV component 1110, a control channel component 1115, a shared channel component 1120, a channel quality component 1125, a TCI state component 1130, and a rate adjustment component 1135. Each of these modules may communicate, directly or indirectly, with one another (e.g., via one or more buses).

The SLIV component 1110 may configure a downlink transmission for transmission using a set of beams and a set of mini-slots, where a duration of a mini-slot is less than a duration of a slot. In some examples, the SLIV component 1110 may indicate a start time of a first mini-slot and a length of the first mini-slot based on the resource allocation pattern, where a start time of a second mini-slot and a length of the second mini-slot is implicitly indicated based on the length of the first mini-slot and a length of a slot encompassing the first mini-slot and the second mini-slot. In some cases, the resource allocation pattern includes a start and length indicator.

In some cases, the duration of the slot includes fourteen OFDM symbols if normal CP is configured and twelve OFDM symbols if extended CP is configured.

The control channel component 1115 may transmit control information indicating a resource allocation pattern for the downlink transmission. In some cases, the control information includes DCI.

The shared channel component 1120 may transmit the downlink transmission based on the resource allocation pattern. In some examples, the shared channel component 1120 may transmit a first portion of the downlink transmission on a first beam of the set of beams during a first mini-slot of the set of mini-slots. In some examples, the shared channel component 1120 may transmit a second portion of the downlink transmission on a second beam of the set of beams during a second mini-slot of the set of mini-slots. In some cases, the downlink transmission includes a PDSCH transmission.

The channel quality component 1125 may receive a report indicating a channel quality of the set of beams.

The TCI state component 1130 may transmit an indication of a set of TCI states corresponding to the set of beams based on the report. In some cases, the indication includes RRC signaling.

The rate adjustment component 1135 may adjust a transmission rate across the set of beams by configuring a duration of a first mini-slot of the set of mini-slots to be different than a duration of a second mini-slot of the set of mini-slots.

Figure 12:
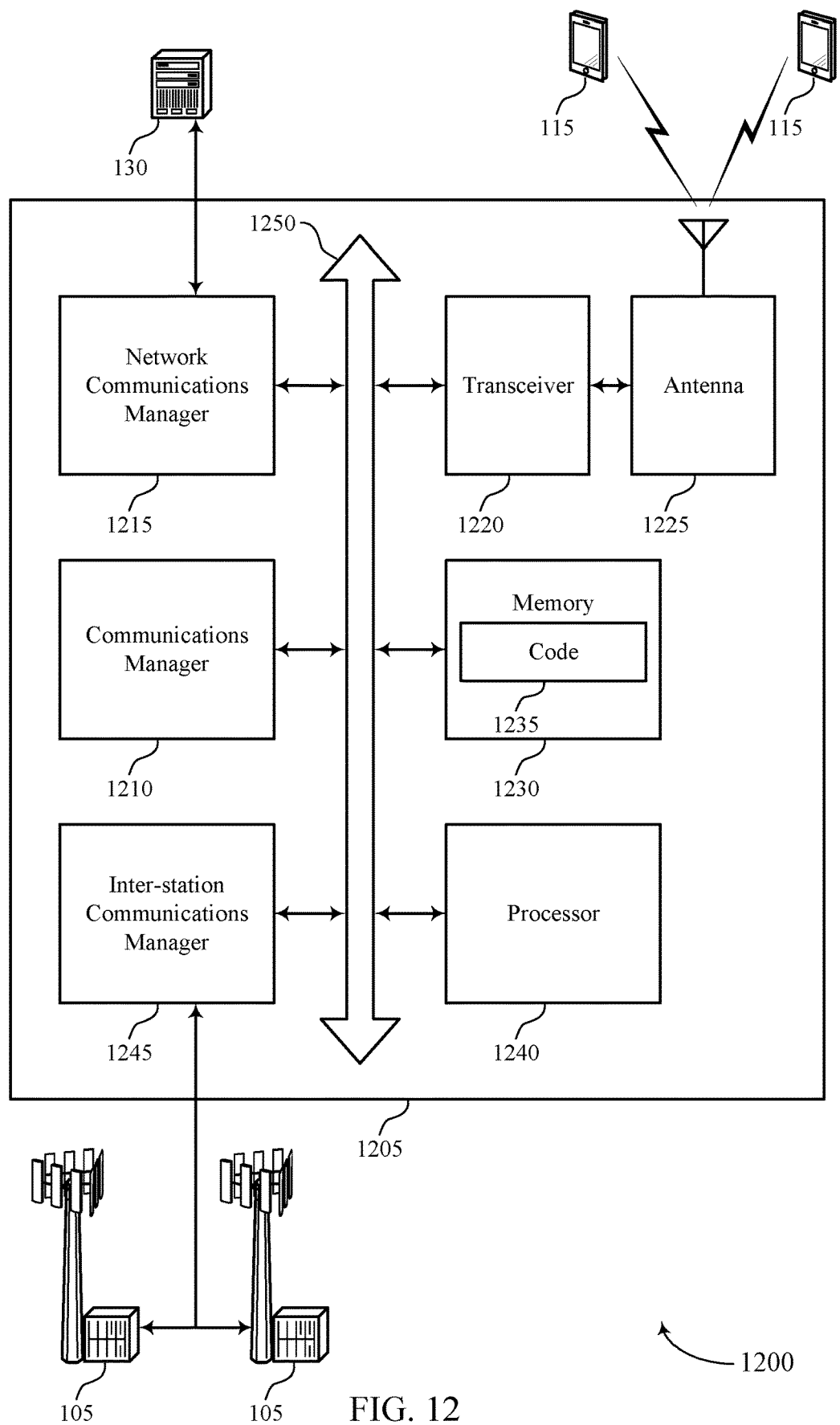
FIG. 12 shows a diagram of a system including a device that supports resource allocation pattern signaling for mini-slots in accordance with aspects of the present disclosure.

FIG. 12 shows a diagram of a system 1200 including a device 1205 that supports resource allocation pattern signaling for mini-slots in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may configure a downlink transmission for transmission using a set of beams and a set of mini-slots, where a duration of a mini-slot is less than a duration of a slot, transmit control information indicating a resource allocation pattern for the downlink transmission, and transmit the downlink transmission based on the resource allocation pattern.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting resource allocation pattern signaling for mini-slots).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
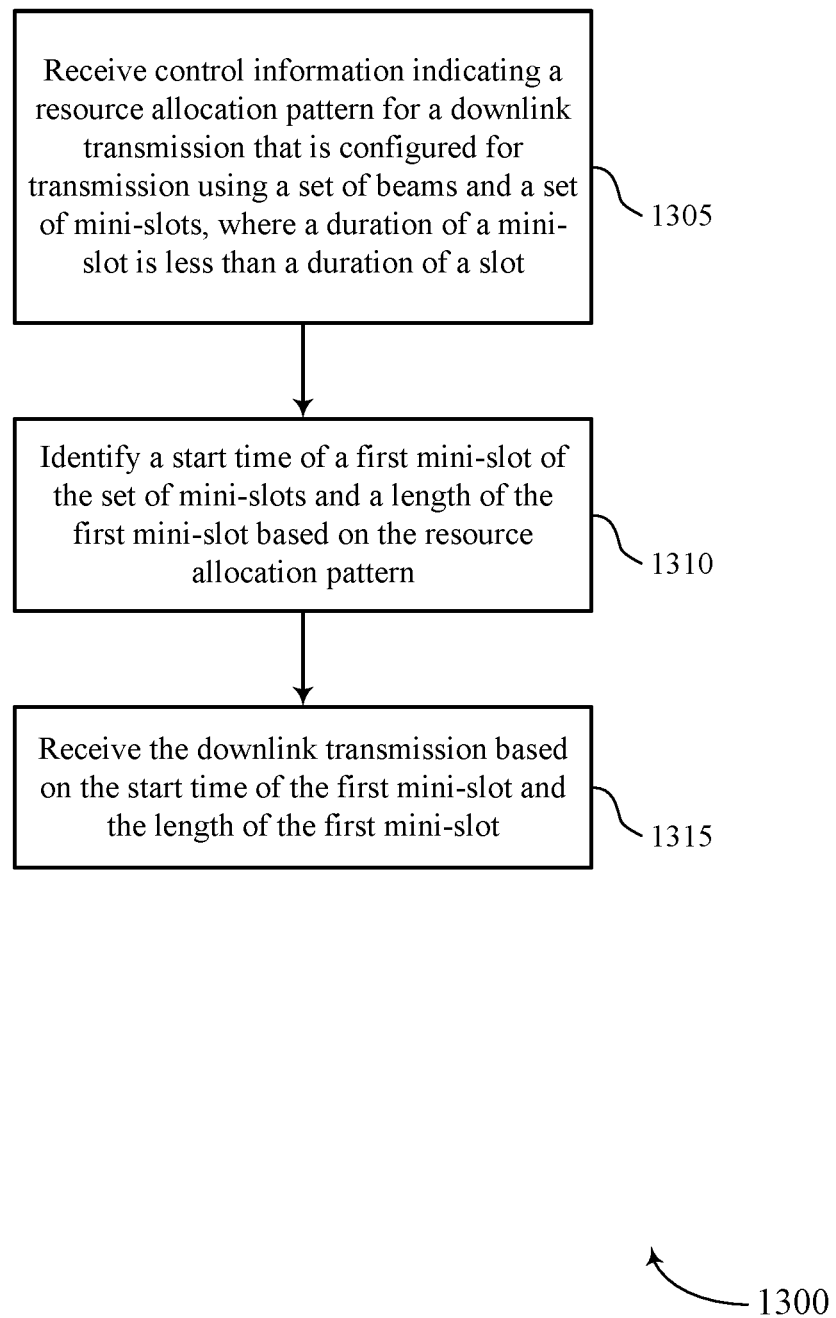
FIGS. 13 through 18 show flowcharts illustrating methods that support resource allocation pattern signaling for mini-slots in accordance with aspects of the present disclosure.

FIG. 13 shows a flowchart illustrating a method 1300 that supports resource allocation pattern signaling for mini-slots in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may receive control information indicating a resource allocation pattern for a downlink transmission that is configured for transmission using a set of beams and a set of mini-slots, where a duration of a mini-slot is less than a duration of a slot. The operations of 1305 may be performed according to the methods described herein. In some examples, aspects of the operations of 1305 may be performed by a control channel component as described with reference to FIGS. 5 through 8.

At 1310, the UE may identify a start time of a first mini-slot of the set of mini-slots and a length of the first mini-slot based on the resource allocation pattern. The operations of 1310 may be performed according to the methods described herein. In some examples, aspects of the operations of 1310 may be performed by a SLIV component as described with reference to FIGS. 5 through 8.

At 1315, the UE may receive the downlink transmission based on the start time of the first mini-slot and the length of the first mini-slot. The operations of 1315 may be performed according to the methods described herein. In some examples, aspects of the operations of 1315 may be performed by a shared channel component as described with reference to FIGS. 5 through 8.

Figure 14:
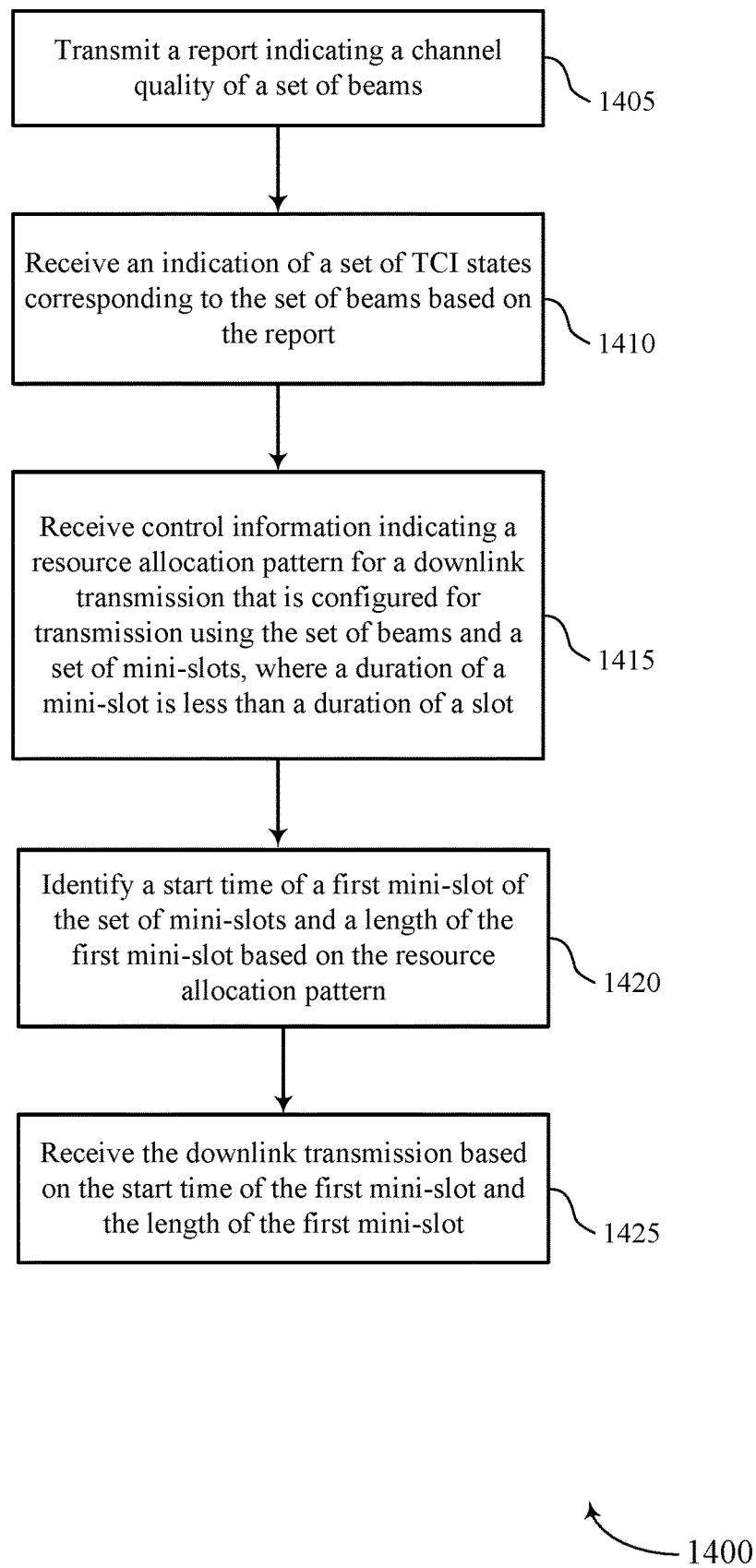

FIG. 14 shows a flowchart illustrating a method 1400 that supports resource allocation pattern signaling for mini-slots in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit a report indicating a channel quality of the set of beams. The operations of 1405 may be performed according to the methods described herein. In some examples, aspects of the operations of 1405 may be performed by a channel quality component as described with reference to FIGS. 5 through 8.

At 1410, the UE may receive an indication of a set of TCI states corresponding to the set of beams based on the report. The operations of 1410 may be performed according to the methods described herein. In some examples, aspects of the operations of 1410 may be performed by a TCI state component as described with reference to FIGS. 5 through 8.

At 1415, the UE may receive control information indicating a resource allocation pattern for a downlink transmission that is configured for transmission using the set of beams and a set of mini-slots, where a duration of a mini-slot is less than a duration of a slot. The operations of 1415 may be performed according to the methods described herein. In some examples, aspects of the operations of 1405 may be performed by a control channel component as described with reference to FIGS. 5 through 8.

At 1420, the UE may identify a start time of a first mini-slot of the set of mini-slots and a length of the first mini-slot based on the resource allocation pattern. The operations of 1420 may be performed according to the methods described herein. In some examples, aspects of the operations of 1420 may be performed by a SLIV component as described with reference to FIGS. 5 through 8.

At 1425, the UE may receive the downlink transmission based on the start time of the first mini-slot and the length of the first mini-slot. The operations of 1425 may be performed according to the methods described herein. In some examples, aspects of the operations of 1425 may be performed by a shared channel component as described with reference to FIGS. 5 through 8.

Figure 15:
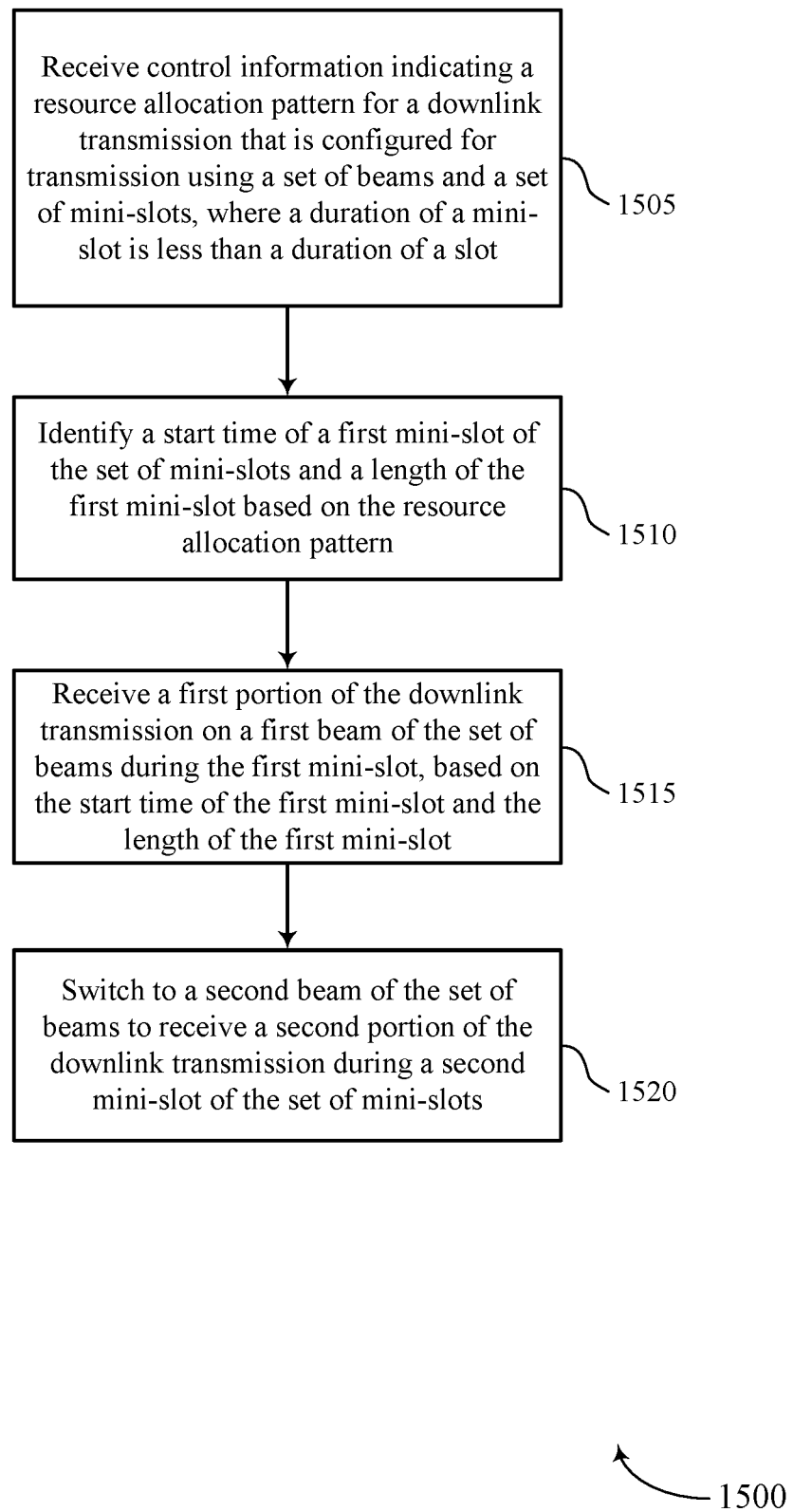

FIG. 15 shows a flowchart illustrating a method 1500 that supports resource allocation pattern signaling for mini-slots in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may receive control information indicating a resource allocation pattern for a downlink transmission that is configured for transmission using a set of beams and a set of mini-slots, where a duration of a mini-slot is less than a duration of a slot. The operations of 1505 may be performed according to the methods described herein. In some examples, aspects of the operations of 1505 may be performed by a control channel component as described with reference to FIGS. 5 through 8.

At 1510, the UE may identify a start time of a first mini-slot of the set of mini-slots and a length of the first mini-slot based on the resource allocation pattern. The operations of 1510 may be performed according to the methods described herein. In some examples, aspects of the operations of 1510 may be performed by a SLIV component as described with reference to FIGS. 5 through 8.

At 1515, the UE may receive a first portion of the downlink transmission on a first beam of the set of beams during the first mini-slot, based on the start time of the first mini-slot and the length of the first mini-slot. The operations of 1515 may be performed according to the methods described herein. In some examples, aspects of the operations of 1515 may be performed by a shared channel component as described with reference to FIGS. 5 through 8.

At 1520, the UE may switch to a second beam of the set of beams to receive a second portion of the downlink transmission during a second mini-slot of the set of mini-slots. The operations of 1520 may be performed according to the methods described herein. In some examples, aspects of the operations of 1520 may be performed by a TCI state component as described with reference to FIGS. 5 through 8.

Figure 16:
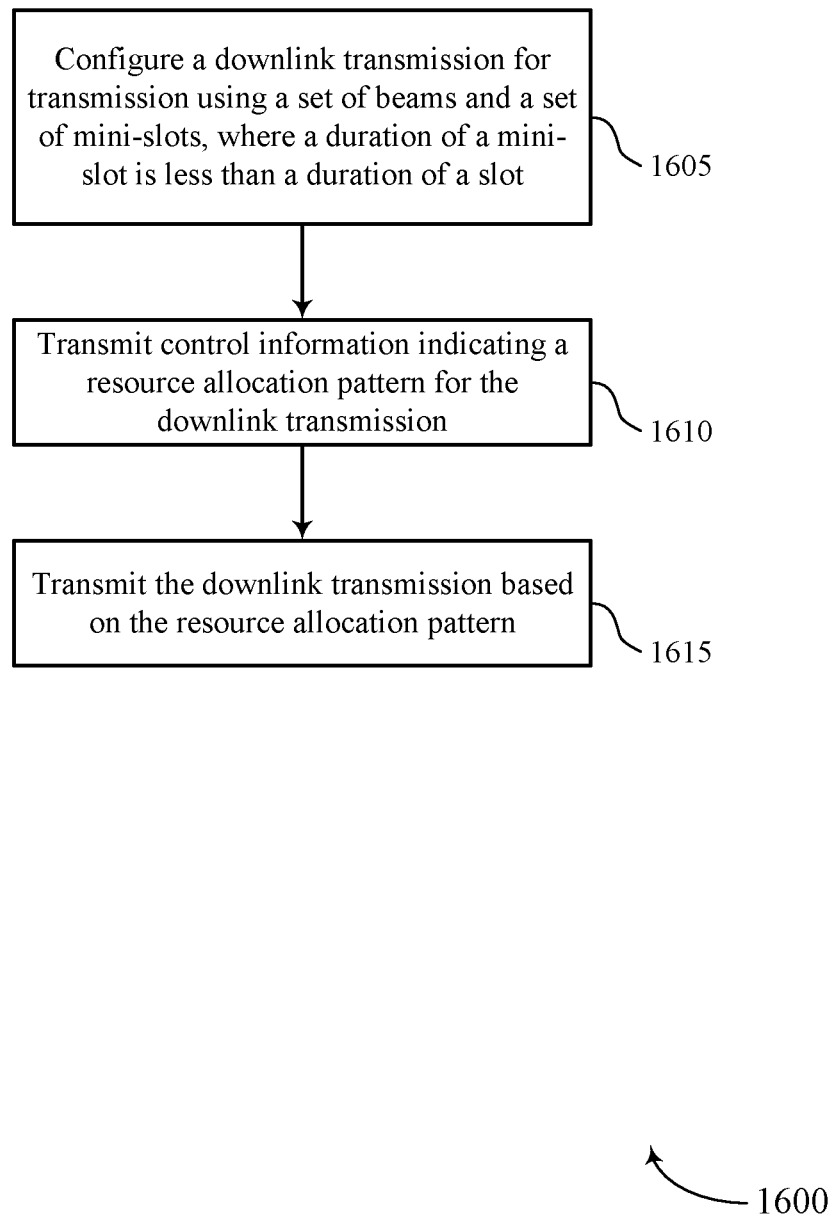

FIG. 16 shows a flowchart illustrating a method 1600 that supports resource allocation pattern signaling for mini-slots in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may configure a downlink transmission for transmission using a set of beams and a set of mini-slots, where a duration of a mini-slot is less than a duration of a slot. The operations of 1605 may be performed according to the methods described herein. In some examples, aspects of the operations of 1605 may be performed by a SLIV component as described with reference to FIGS. 9 through 12.

At 1610, the base station may transmit control information indicating a resource allocation pattern for the downlink transmission. The operations of 1610 may be performed according to the methods described herein. In some examples, aspects of the operations of 1610 may be performed by a control channel component as described with reference to FIGS. 9 through 12.

At 1615, the base station may transmit the downlink transmission based on the resource allocation pattern. The operations of 1615 may be performed according to the methods described herein. In some examples, aspects of the operations of 1615 may be performed by a shared channel component as described with reference to FIGS. 9 through 12.

Figure 17:
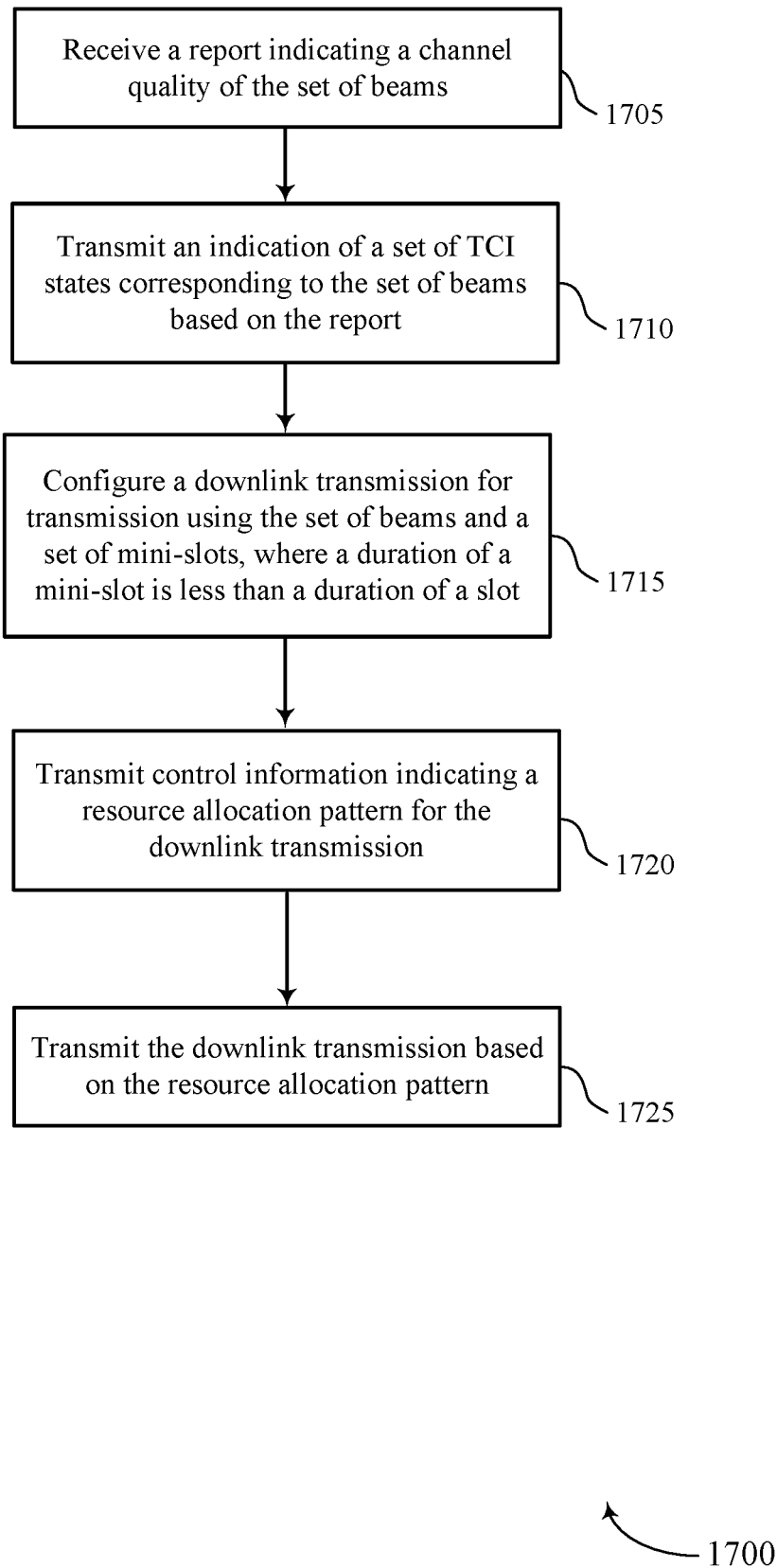

FIG. 17 shows a flowchart illustrating a method 1700 that supports resource allocation pattern signaling for mini-slots in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive a report indicating a channel quality of the set of beams. The operations of 1705 may be performed according to the methods described herein. In some examples, aspects of the operations of 1705 may be performed by a channel quality component as described with reference to FIGS. 9 through 12.

At 1710, the base station may transmit an indication of a set of TCI states corresponding to the set of beams based on the report. The operations of 1710 may be performed according to the methods described herein. In some examples, aspects of the operations of 1710 may be performed by a TCI state component as described with reference to FIGS. 9 through 12.

At 1715, the base station may configure a downlink transmission for transmission using the set of beams and a set of mini-slots, where a duration of a mini-slot is less than a duration of a slot. The operations of 1715 may be performed according to the methods described herein. In some examples, aspects of the operations of 1715 may be performed by a SLIV component as described with reference to FIGS. 9 through 12.

At 1720, the base station may transmit control information indicating a resource allocation pattern for the downlink transmission. The operations of 1720 may be performed according to the methods described herein. In some examples, aspects of the operations of 1720 may be performed by a control channel component as described with reference to FIGS. 9 through 12.

At 1715, the base station may transmit the downlink transmission based on the resource allocation pattern. The operations of 1715 may be performed according to the methods described herein. In some examples, aspects of the operations of 1715 may be performed by a shared channel component as described with reference to FIGS. 9 through 12.

Figure 18:
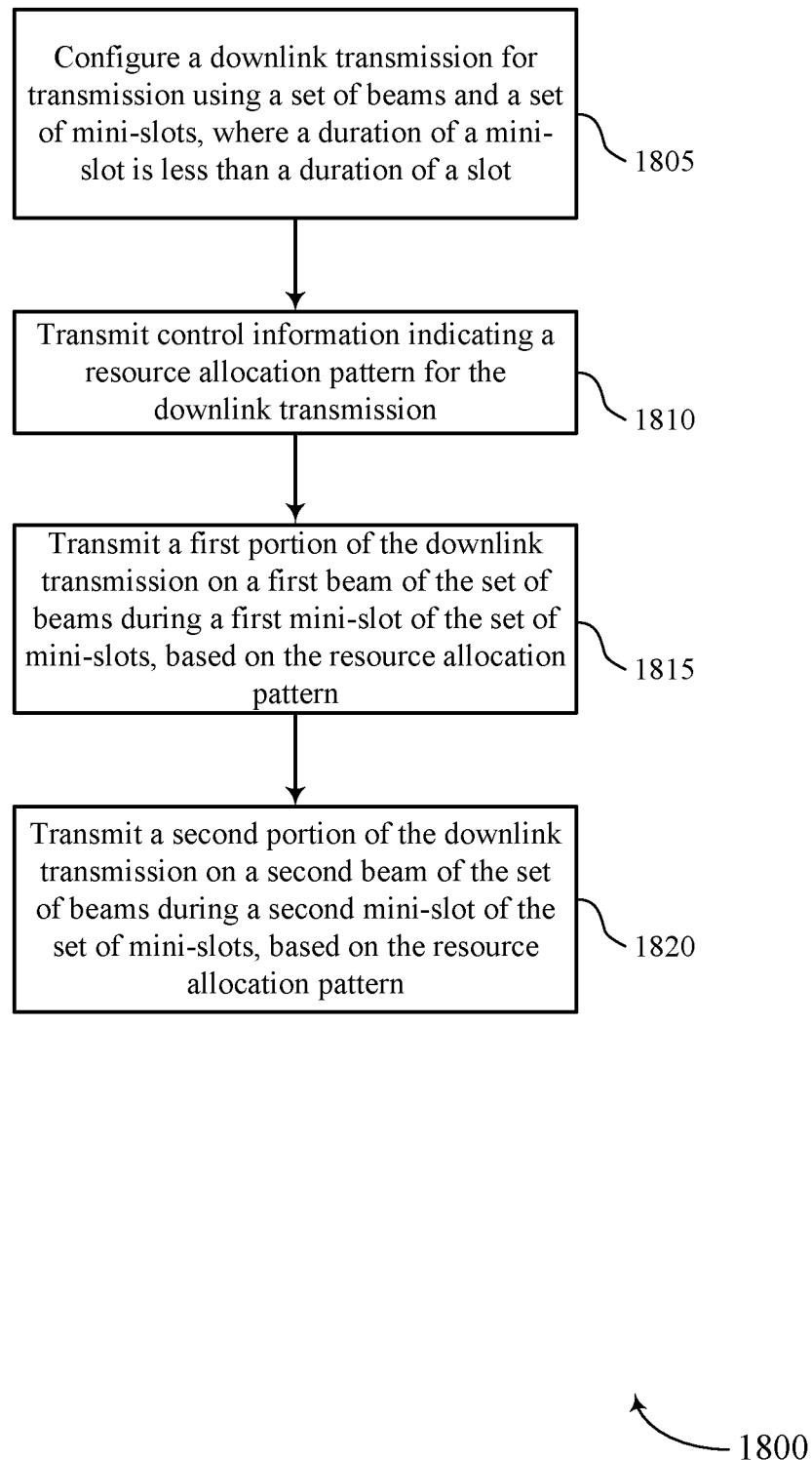

FIG. 18 shows a flowchart illustrating a method 1800 that supports resource allocation pattern signaling for mini-slots in accordance with aspects of the present disclosure. The operations of method 1800 may be implemented by a base station 105 or its components as described herein. For example, the operations of method 1800 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1805, the base station may configure a downlink transmission for transmission using a set of beams and a set of mini-slots, where a duration of a mini-slot is less than a duration of a slot. The operations of 1805 may be performed according to the methods described herein. In some examples, aspects of the operations of 1805 may be performed by a SLIV component as described with reference to FIGS. 9 through 12.

At 1810, the base station may transmit control information indicating a resource allocation pattern for the downlink transmission. The operations of 1810 may be performed according to the methods described herein. In some examples, aspects of the operations of 1810 may be performed by a control channel component as described with reference to FIGS. 9 through 12.

At 1815, the base station may transmit a first portion of the downlink transmission on a first beam of the set of beams during a first mini-slot of the set of mini-slots, based on the resource allocation pattern. The operations of 1815 may be performed according to the methods described herein. In some examples, aspects of the operations of 1815 may be performed by a shared channel component as described with reference to FIGS. 9 through 12.

At 1820, the base station may transmit a second portion of the downlink transmission on a second beam of the set of beams during a second mini-slot of the set of mini-slots, based on the resource allocation pattern. The operations of 1820 may be performed according to the methods described herein. In some examples, aspects of the operations of 1820 may be performed by a shared channel component as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving an indication of a plurality of transmission configuration indication (TCI) states corresponding to a plurality of beams;
   receiving control information indicating a resource allocation pattern for a downlink transmission that is configured for transmission using the plurality of beams and a plurality of mini-slots, wherein a duration of a mini-slot is less than a duration of a slot;
   identifying a start time of a first mini-slot of the plurality of mini-slots and a length of the first mini-slot based at least in part on the resource allocation pattern; and
   receiving the downlink transmission based at least in part on the start time of the first mini-slot and the length of the first mini-slot.

2. The method of claim 1, wherein the indication comprises radio resource control (RRC) signaling.

3. The method of claim 1, further comprising:
   receiving a first portion of the downlink transmission on a first beam of the plurality of beams during the first mini-slot; and
   switching to a second beam of the plurality of beams to receive a second portion of the downlink transmission during a second mini-slot of the plurality of mini-slots.

4. The method of claim 1, further comprising:
   determining a start time of a second mini-slot based at least in part on the length of the first mini-slot.

5. The method of claim 1, further comprising:
   determining a length of a second mini-slot based at least in part on the length of the first mini-slot and a length of a slot encompassing the first mini-slot and the second mini-slot.

6. The method of claim 1, wherein a duration of each of the plurality of mini-slots are equal to each other.

7. The method of claim 6, wherein the resource allocation pattern indicates the start time of the first mini-slot and the duration of the first mini-slot.

8. The method of claim 1, wherein a duration of the first mini-slot is different than a duration of a second mini-slot, and wherein the duration of the first mini-slot and the duration of the second mini-slot are based at least in part on a rate adjustment across the plurality of beams.

9. The method of claim 1, wherein the control information comprises downlink control information (DCI).

10. The method of claim 1, wherein the resource allocation pattern comprises a start and length indicator (SLIV).

11. The method of claim 1, wherein the downlink transmission comprises a physical downlink shared channel (PDSCH) transmission.

12. The method of claim 1, wherein the start time for the first mini-slot comprises an index for an orthogonal frequency division multiplexing (OFDM) symbol that starts the first mini-slot.

13. The method of claim 1, wherein the length for the first mini-slot comprises a duration of orthogonal frequency division multiplexing (OFDM) symbols.

14. A method for wireless communication at base station, comprising:
   transmitting an indication of a plurality of transmission configuration indication (TCI) states corresponding to a plurality of beams;
   configuring a downlink transmission for transmission using the plurality of beams and a plurality of mini-slots, wherein a duration of a mini-slot is less than a duration of a slot;
   transmitting control information indicating a resource allocation pattern for the downlink transmission; and
   transmitting the downlink transmission based at least in part on the resource allocation pattern.

15. The method of claim 14, wherein the indication comprises radio resource control (RRC) signaling.

16. The method of claim 14, further comprising:
   transmitting a first portion of the downlink transmission on a first beam of the plurality of beams during a first mini-slot of the plurality of mini-slots; and
   transmitting a second portion of the downlink transmission on a second beam of the plurality of beams during a second mini-slot of the plurality of mini-slots.

17. The method of claim 14, further comprising:
   indicating a start time of a first mini-slot and a length of the first mini-slot based at least in part on the resource allocation pattern, wherein a start time of a second mini-slot and a length of the second mini-slot is implicitly indicated based at least in part on the length of the first mini-slot and a length of a slot encompassing the first mini-slot and the second mini-slot.

18. The method of claim 14, further comprising:
   adjusting a transmission rate across the plurality of beams by configuring a duration of a first mini-slot of the plurality of mini-slots to be different than a duration of a second mini-slot of the plurality of mini-slots.

19. The method of claim 14, wherein the control information comprises downlink control information (DCI).

20. The method of claim 14, wherein the resource allocation pattern comprises a start and length indicator (SLIV).

21. The method of claim 14, wherein the downlink transmission comprises a physical downlink shared channel (PDSCH) transmission.

22. An apparatus for wireless communication at a user equipment (UE), comprising:
   a processor,
   memory coupled to the processor; and
   instructions stored in the memory and executable by the processor to cause the apparatus to:
   receive an indication of a plurality of transmission configuration indication (TCI) states corresponding to a plurality of beams;

receive control information indicating a resource allocation pattern for a downlink transmission that is configured for transmission using the plurality of beams and a plurality of mini-slots, wherein a duration of a mini-slot is less than a duration of a slot;

identify a start time of a first mini-slot of the plurality of mini-slots and a length of the first mini-slot based at least in part on the resource allocation pattern; and receive the downlink transmission based at least in part on the start time of the first mini-slot and the length of the first mini-slot.

23. The apparatus of claim 22, wherein the indication comprises radio resource control (RRC) signaling.

24. The apparatus of claim 22, wherein the instructions are further executable by the processor to cause the apparatus to:

receive a first portion of the downlink transmission on a first beam of the plurality of beams during the first mini-slot; and switch to a second beam of the plurality of beams to receive a second portion of the downlink transmission during a second mini-slot of the plurality of mini-slots.

25. The apparatus of claim 22, wherein the instructions are further executable by the processor to cause the apparatus to:

determine a start time of a second mini-slot based at least in part on the length of the first mini-slot; or determine a length of the second mini-slot based at least in part on the length of the first mini-slot and a length of a slot encompassing the first mini-slot and the second mini-slot;

or a combination thereof.

26. An apparatus for wireless communication at base station, comprising:

a processor, memory coupled to the processor; and instructions stored in the memory and executable by the processor to cause the apparatus to:

transmit an indication of a plurality of transmission configuration indication (TCI) states corresponding to a plurality of beams;

configure a downlink transmission for transmission using a plurality of beams and a plurality of mini-slots, wherein a duration of a mini-slot is less than a duration of a slot;

transmit control information indicating a resource allocation pattern for the downlink transmission; and transmit the downlink transmission based at least in part on the resource allocation pattern.

\* \* \* \* \*